US012779443B2

(12) United States Patent
Wang et al.

(10) Patent No.: US 12,779,443 B2
(45) Date of Patent: Nov. 3, 2026

(54) PHOTOCATALYTIC MATERIAL FOR EFFICIENT PHOTOCATALYTIC REMOVAL OF HIGH-CONCENTRATION NITRATE, AND PREPARATION METHOD AND USE THEREOF

(71) Applicants: NANJING UNIVERSITY, Nanjing (CN); Jiangsu Guochuang Low Carbon Technology Co., Ltd., Yancheng (CN)

(72) Inventors: Jinnan Wang, Nanjing (CN); Zhiang Hou, Nanjing (CN); Weilin Bian, Yancheng (CN); Yi Wang, Yancheng (CN); Jiangfeng Chu, Nanjing (CN); Cong Liu, Nanjing (CN)

(73) Assignees: NANJING UNIVERSITY, Nanjing (CN); Jiangsu Guochuang Low Carbon Technology Co., Ltd., Yancheng (CN)

( * ) Notice: Subject to any disclaimer, the term of this patent is extended or adjusted under 35 U.S.C. 154(b) by 736 days.

(21) Appl. No.: 18/028,243

(22) PCT Filed: Aug. 24, 2021

(86) PCT No.: PCT/CN2021/114276
§ 371 (c)(1),
(2) Date: Mar. 24, 2023

(87) PCT Pub. No.: WO2022/062804
PCT Pub. Date: Mar. 31, 2022

(65) Prior Publication Data

US 2023/0372918 A1 Nov. 23, 2023

(30) Foreign Application Priority Data

Sep. 24, 2020 (CN) ........................ 202011016441.2

(51) Int. Cl.
*B01J 35/39* (2024.01)
*B01J 23/50* (2006.01)
(Continued)

(52) U.S. Cl.
CPC ............... *B01J 35/39* (2024.01); *B01J 23/50* (2013.01); *B01J 35/45* (2024.01); *B01J 35/70* (2024.01);
(Continued)

(58) Field of Classification Search
CPC ... B01J 35/39; B01J 23/50; B01J 35/45; B01J 35/70; B01J 37/10; B01J 2235/00;
(Continued)

(56) References Cited

FOREIGN PATENT DOCUMENTS

| | | |
|---|---|---|
| CN | 101596456 A | 12/2009 |
| CN | 106268727 A | 1/2017 |

(Continued)

OTHER PUBLICATIONS

Zhou "SiO2—Ag—SiO2—TiO2 multi-shell structures: plasmon enhanced photocatalysts with wide-spectral-response", 2013, RSC Publishing, Journal of Materials Chemistry A, p. 13128-13138 (Year: 2013).*

(Continued)

*Primary Examiner* — Anthony J Zimmer
*Assistant Examiner* — Starfari Teshawn Mcclain
(74) *Attorney, Agent, or Firm* — Bayramoglu Law Offices LLC

(57) ABSTRACT

A photocatalytic material for efficient photocatalytic removal of a high-concentration nitrate, and a preparation method and use thereof are disclosed. The preparation method includes the following steps: step 1: preparation of a citrate-stabilized silver nanoparticle; step 2: synthesis and functionalization modification of $SiO_2$ step 3: preparation of $Ag/SiO_2$; and step 4: preparation of an $Ag/SiO_2@cTiO_2$ (Continued)

core-shell structure. The photocatalytic material prepared by the present disclosure has high reduction catalytic activity and can quickly remove a high-concentration nitrate and achieve high nitrogen selectivity. In addition, due to protection of a titanium dioxide shell, the photocatalytic material has excellent stability and can remove a high-concentration nitrate in water when the nitrate coexists with a high-concentration chloride ion.

8 Claims, 13 Drawing Sheets

(51) Int. Cl.

| | |
|---|---|
| ***B01J 35/45*** | (2024.01) |
| ***B01J 35/70*** | (2024.01) |
| ***B01J 37/10*** | (2006.01) |
| ***C02F 1/30*** | (2023.01) |
| ***C02F 101/16*** | (2006.01) |

(52) U.S. Cl.
CPC ................. *B01J 37/10* (2013.01); *C02F 1/30* (2013.01); *B01J 2235/00* (2024.01); *B01J 2235/15* (2024.01); *B01J 2235/30* (2024.01); *C02F 2101/163* (2013.01); *C02F 2305/10* (2013.01)

(58) Field of Classification Search
CPC B01J 2235/15; B01J 2235/30; B01J 37/0207; B01J 37/0209; B01J 37/0211; B01J 37/0221; B01J 37/16; B01J 21/063; C02F 1/30; C02F 2101/163; C02F 2305/10; C02F 1/70; C02F 2305/08
See application file for complete search history.

(56) References Cited

FOREIGN PATENT DOCUMENTS

| | | | | | |
|---|---|---|---|---|---|
| CN | 106315755 A | | 1/2017 | | |
| CN | 106521995 A | | 3/2017 | | |
| CN | 107008259 A | * | 8/2017 | .............. | B01J 23/52 |
| CN | 107096531 A | | 8/2017 | | |
| CN | 109126784 A | * | 1/2019 | ............. | C07C 45/29 |
| CN | 109622019 A | | 4/2019 | | |
| CN | 110013882 A | | 7/2019 | | |
| CN | 111974385 A | | 11/2020 | | |
| JP | 2006291136 A | | 10/2006 | | |

OTHER PUBLICATIONS

Zhang, "Preparation of monodisperse silica particles with controllable size and shape National Laboratory of Solid State Microstructures," J Nanopart Res, Department of Physics, Nanjing University (Year: 2002).*

Mikae Synthesis and characterization of silver colloidal nanoparticles with different coatings for SERS application (Year: 2014).*

Thomas Caswell, et al., Enhancement in the rate of nitrate degradation on Au- and Ag-decorated TiO2 photocatalysts, Catal. Sci. Technol, 2020, pp. 1-20, vol. 10.

Duoren Wang, Green chemical additives, 2006.

Koichi Awazu, et al., A Plasmonic Photocatalyst Consisting of Silver Nanoparticles Embedded in Titanium Dioxide, Journal of the American Chemical Society, 2008, pp. 1676-1680, vol. 130, No. 5.

* cited by examiner

PHOTOCATALYTIC MATERIAL FOR EFFICIENT PHOTOCATALYTIC REMOVAL OF HIGH-CONCENTRATION NITRATE, AND PREPARATION METHOD AND USE THEREOF

CROSS REFERENCE TO THE RELATED APPLICATIONS

This application is the national phase entry of International Application No. PCT/CN2021/114276, filed on Aug. 24, 2021, which is based upon and claims priority to Chinese Patent Application No. 202011016441.2, filed on Sep. 24, 2020, the entire contents of which are incorporated herein by reference.

TECHNICAL FIELD

The present disclosure belongs to the field of environmental functional materials (EFMs), and the present disclosure relates to a photocatalytic material, and in particular to a photocatalytic material for efficient photocatalytic removal of a high-concentration nitrate, and a preparation method and use thereof.

BACKGROUND

Due to the combustion of increasing fossil fuels and the continuous growth in the demand for nitrogen-containing raw materials in industry and agriculture, which involved generally inefficient use, a large number of nitrates are produced by human activities and discharged into the water to become one of the most abundant pollutants in the surface water and groundwater, causing a series of environmental and human health problems. Countries and organizations worldwide have set a strict upper limit for nitrate concentration in drinking water. As a relatively new eco-friendly technique, photocatalytic denitrification has become a research hotspot for the removal of nitrates in water due to its advantages such as simplicity, high efficiency, and no secondary pollution. However, the selectivity for a photocatalytic denitrification product and the activity and stability of a photocatalyst in a complex system with a high-concentration nitrate limits the practical application of photocatalytic denitrification.

The patent with application No. 2015102738202 discloses a titanium dioxide material selectively modified with a precious metal nanoparticle, and a preparation method and use thereof. Specifically, the patent discloses a method for preparing a photocatalytic material by selectively modifying different crystal planes of titanium dioxide with the precious metal nanoparticle, and a use of the photocatalytic material in reductive removal of nitric nitrogen in the water. A preparation process of such a photocatalytic material takes 96 h or more and is extremely cumbersome. Although the photocatalytic material has a prominent removal effect for nitrates, the nitrogen selectivity of the photocatalytic material and the stability of the photocatalytic material in recycling are not satisfied. Therefore, the photocatalytic material can hardly be practically used.

The patent with application No. 201610891842 discloses a method for removing nitric nitrogen in water through photocatalytic reduction and an Ag—$Ag_2O/TiO_2$ composite photocatalyst. The composite photocatalyst can be used in photocatalytic denitrification with formic acid as a sacrifice agent. However, the catalytic activity of the composite photocatalyst for a high-concentration nitrate is not efficient, and in a complex system (with $Cl^-$), $Ag^+$ is easy to react with $Cl^-$ to produce silver chloride and thus becomes inactive.

The patent with application No. 201910126461.6 discloses a nitride catalyst for efficient photocatalytic reduction of nitrate in water and a water treatment method using thereby. Specifically, the patent discloses a covalent nitride with a chemical formula of $X_x N_y$. The nitride catalyst has a high removal rate for nitrates but exhibits a low nitrogen selectivity of less than 50%, which seriously limits the application of the nitride catalyst.

In summary, the current single titanium dioxide-based photocatalysts have problems such as low reductive removal efficiency and poor selectivity of nitric nitrogen and the modified titanium dioxide generally has problems such as low reduction efficiency for a high-concentration nitrate and poor stability in a complex system.

SUMMARY

The present disclosure provides a photocatalytic material for efficient photocatalytic removal of a high-concentration nitrate, and a preparation method and use thereof, such as to overcome the shortcomings of the prior art.

To achieve the above objective, the present disclosure provides a preparation method of a photocatalytic material for efficient photocatalytic removal of a high-concentration nitrate, including the following steps:

Step 1: preparation of a citrate-stabilized silver nanoparticle: adding a sodium citrate solution as a stabilizer to a silver nitrate solution, adding a sodium borohydride solution dropwise to a resulting mixed solution at room temperature, and vigorously stirring to obtain a yellow-brown silver nanoparticle colloid solution;

Step 2: synthesis and functionalization modification of $SiO_2$: adding a small amount of tetraethyl orthosilicate (TEOS) dropwise to a mixed solution of water, ammonia water, and isopropyl alcohol (IPA), vigorously stirring a resulting mixture in a water bath to continue a reaction to obtain a silicon dioxide ($SiO_2$) seed (a white suspension), and adding TEOS once again dropwise to a resulting reaction system to allow a reaction; collecting a product through centrifugation, and washing and drying the product to obtain a $SiO_2$ microsphere;

In order to make a surface of $SiO_2$ positively charged, ultrasonically dispersing the synthesized $SiO_2$ in ethanol, adding (3-aminopropyl) triethoxysilane (APTES), and stirring a resulting mixture in a water bath; and collecting a product through centrifugation, repeatedly washing the product with ethanol, and drying the product to obtain APTES-$SiO_2$;

Step 3: preparation of $Ag/SiO_2$: dispersing APTES-$SiO_2$ in deionized water, adding the diluted silver nanoparticle colloid solution dropwise, vigorously stirring; and collecting a product through suction filtration, and washing and drying the product to obtain $Ag/SiO_2$, where an amount of the silver nanoparticle colloid solution can be changed to obtain $SiO_2$ products loaded with Ag in different proportions; and Step 4: preparation of an $Ag/SiO_2$@c$TiO_2$ core-shell structure: ultrasonically dispersing $Ag/SiO_2$ uniformly in ethanol, and adding hexadecylamine (HDA) and ammonia water; stirring a resulting mixture at room temperature for uniform dispersion, during which titanium isopropoxide is added to allow a reaction; collecting $Ag/SiO_2$@a$TiO_2$ with an amorphous titanium dioxide shell (a stands for amorphous) through centrifugation, and washing three times with each of water and ethanol;

In order to prepare $Ag/SiO_2@cTiO_2$ with a mesoporous structure and a crystalline $TiO_2$ shell (c stands for a crystal), dispersing $Ag/SiO_2@aTiO_2$ in a mixed solution of ethanol and water, transferring a resulting solution to a reactor, and placing the reactor at a high temperature to allow a reaction. After the reaction is completed, cooling the reactor to room temperature, and collecting a product through centrifugation, washing and drying the product, and subjecting the product to a post-treatment and then to calcination in a muffle furnace to obtain Ag/SiO2@cTiO2 with a crystalline titanium dioxide shell.

Further, for the preparation method of a photocatalytic material for efficient photocatalytic removal of a high-concentration nitrate provided by the present disclosure, in step 1, the sodium borohydride, the sodium citrate, and the silver nitrate are in a volume ratio of 1:4:50 and in a concentration ratio of 112:40:1.

Further, for the preparation method of a photocatalytic material for efficient photocatalytic removal of a high-concentration nitrate provided by the present disclosure, in step 2, the TEOS and the mixed solution for preparing the $SiO_2$ seed and the TEOS added later are in a volume ratio of 0.6:100:5; the water, the ammonia water, and the IPA in the mixed solution are in a volume ratio of 5:3:12; and the water bath for preparing the $SiO_2$ has a temperature of 30° C. to 40° C.

Further, for the preparation method of a photocatalytic material for efficient photocatalytic removal of a high-concentration nitrate provided by the present disclosure, in step 2, a concentration of the $SiO_2$ dispersed in the ethanol is 2 g/L; a volume ratio of the APTES to the ethanol is 1:100; and the water bath for modification with the APTES has a temperature of 50° C. to 60° C.

Further, for the preparation method of a photocatalytic material for efficient photocatalytic removal of a high-concentration nitrate provided by the present disclosure, in step 3, a concentration of the APTES-$SiO_2$ dispersed in the deionized water is 0.5 g/L; the silver nanoparticle colloid solution has a concentration of 0.1 mg/L; and a volume ratio of the silver nanoparticle colloid solution to the deionized water is (1-10):40.

Further, for the preparation method of a photocatalytic material for efficient photocatalytic removal of a high-concentration nitrate provided by the present disclosure, in step 4, during the preparation of the $Ag/SiO_2@aTiO_2$, a concentration of each of the $Ag/SiO_2$ and the HDA dispersed in the ethanol is 8 g/L; the ammonia water, the titanium isopropoxide, and the ethanol are in a volume ratio of 1:1:50; and the reaction is conducted for 10 minutes.

Further, for the preparation method of a photocatalytic material for efficient photocatalytic removal of a high-concentration nitrate provided by the present disclosure, in step 4, during the preparation of the $Ag/SiO_2@cTiO_2$, a concentration of the $Ag/SiO_2@aTiO_2$ dispersed in a mixed solution of the ethanol and water is 0.67 g/L, and a ratio of the ethanol to the water in the mixed solution is 2:1.

Further, for the preparation method of a photocatalytic material for efficient photocatalytic removal of a high-concentration nitrate provided by the present disclosure, in step 4, the reactor is a stainless-steel high-pressure reactor lined with polytetrafluoroethylene (PTFE); the reaction in the reactor is conducted at 140° C. to 160° C. for 12 h to 16 h; and the calcination is conducted at 400° C. to 500° C. for 2 h with a heating rate of 5° C./minute.

The present disclosure also provides a photocatalytic material for efficient photocatalytic removal of a high-concentration nitrate prepared by the preparation method.

The present disclosure also provides a use of the photocatalytic material for efficient photocatalytic removal of a high-concentration nitrate in the removal of a nitrate ion in water through photocatalytic reduction.

The present disclosure has the following beneficial effects: in the present disclosure, a silver nanoparticle and a silicon dioxide microsphere with a surface positively-charged are separately prepared, then $Ag/SiO_2$ is prepared through electrostatic self-assembly, an amorphous titanium dioxide shell is wrapped around $Ag/SiO_2$ through directed coordinative self-assembly, and the amorphous titanium dioxide shell is finally crystallized into an anatase crystal through hydrothermal and calcination treatments to obtain $Ag/SiO_2@cTiO_2$. In the $Ag/SiO_2@cTiO_2$ prepared by the present disclosure, the Ag nanoparticle can serve as an electron trap to receive conduction band electrons of $TiO_2$, thereby promoting the separation of photon-generated carriers and significantly improving the migration efficiency of photon-generated carriers; and a surface plasmon resonance (SPR) effect of the Ag nanoparticle itself can excite increased thermoelectrons to increase a photocurrent density, thereby further promoting the improvement of photocatalytic activity. In addition, the core-shell structure composed of a $TiO_2$ shell with a high refractive index and a $SiO_2$ core with a low refractive index improves the absorption and utilization of light through a light scattering effect. The core-shell structure overcomes the competitive absorption of a high-concentration nitrate for photons; and the protection of the core-shell structure for the Ag nanoparticle improves the stability of the catalyst in recycling, such that the catalyst can achieve the photocatalytic reduction of a high-concentration nitrate and has the potential to remove a nitrate in a high-salinity brine.

The new $Ag/SiO_2@cTiO_2$ photocatalytic material with a three-dimensional (3D) core-shell structure prepared by the present disclosure has the following advantages compared with the traditional titanium dioxide-based catalyst:

1. The photocatalytic material prepared by the present disclosure has high reduction catalytic activity and can quickly remove a high-concentration nitrate and achieve high nitrogen selectivity.
2. Due to protection of a titanium dioxide shell, the photocatalytic material has excellent stability and can remove a high-concentration nitrate in water when the nitrate coexists with a high-concentration chloride ion.

DETAILED DESCRIPTION OF THE INVENTION

Figure 1A:
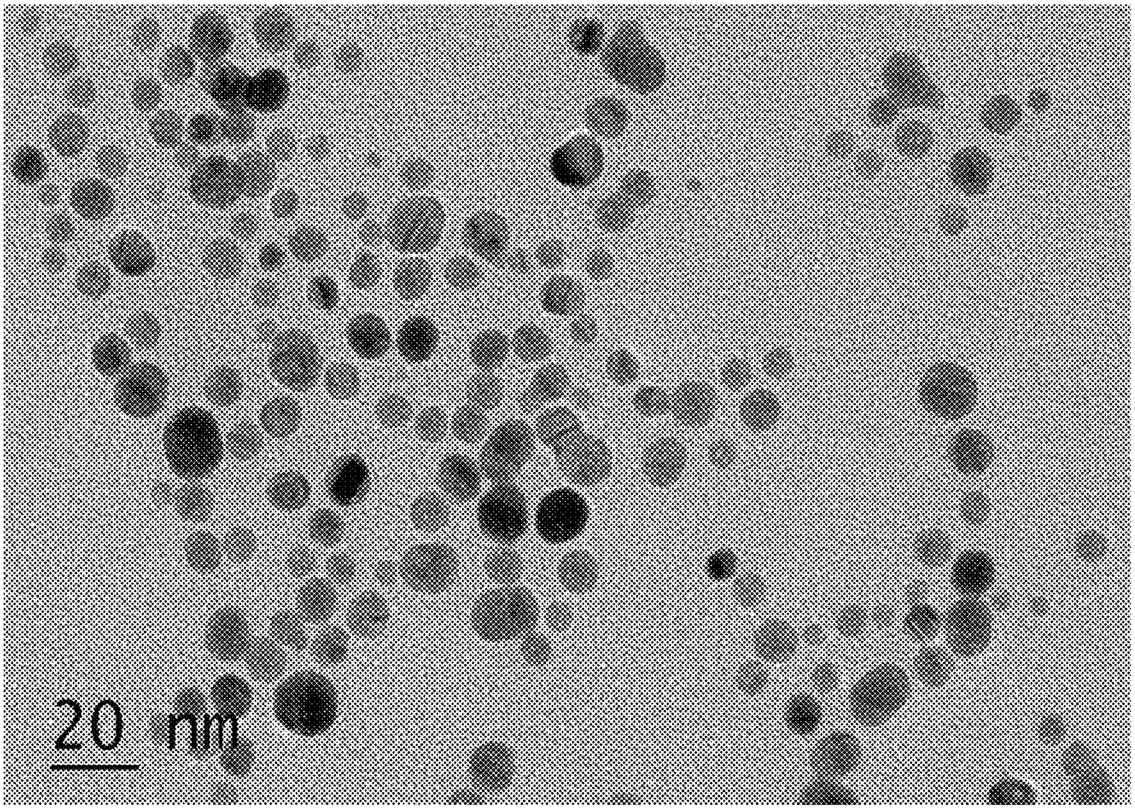
FIG. 1A is a transmission electron microscopy (TEM) image of the Ag nanoparticle obtained in step 1.
Figure 1B:
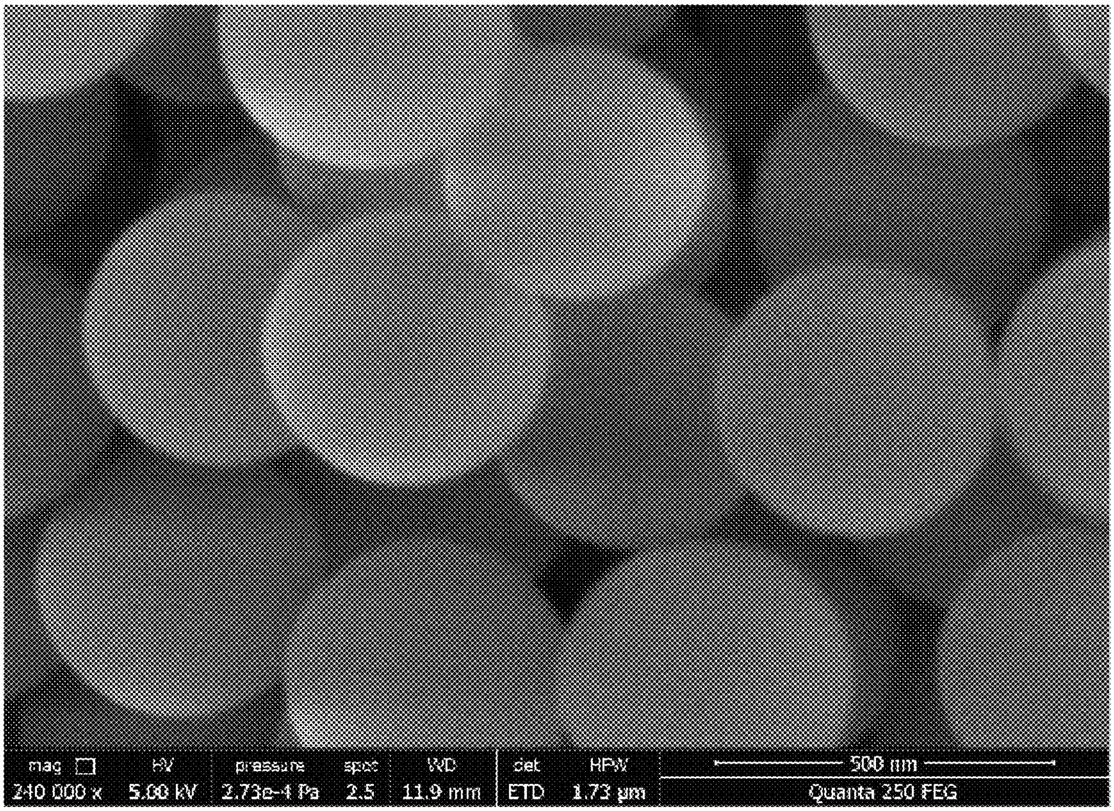
FIG. 1B is a scanning electron microscopy (SEM) image of the $SiO_2$ obtained in step 2.
Figure 1C:
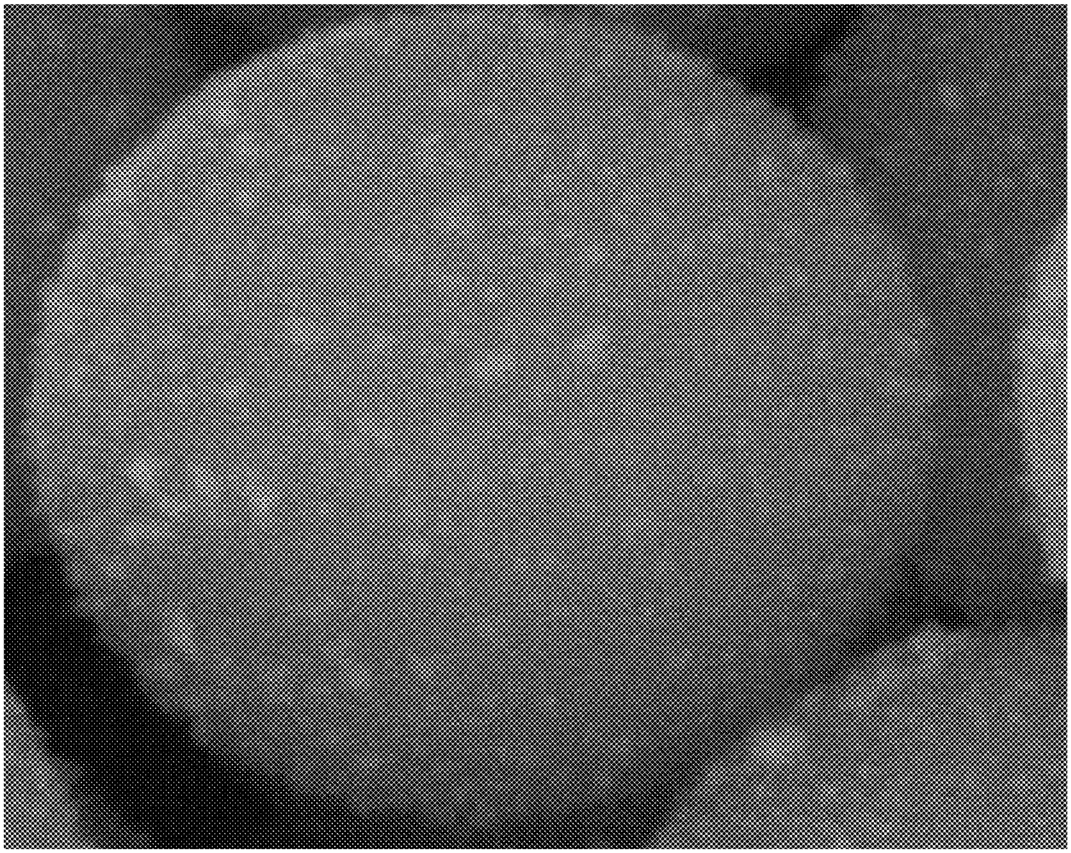
FIG. 1C is an SEM image of the $Ag/SiO_2$ obtained in step 3.
Figure 1D:
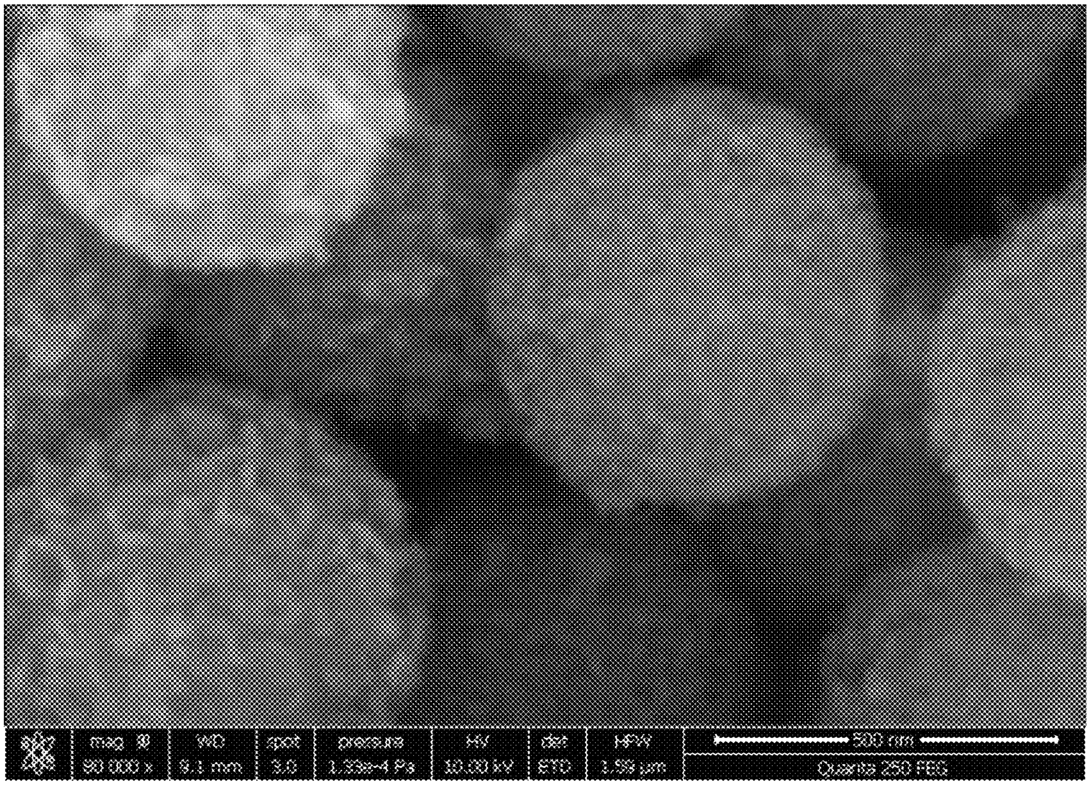
FIG. 1D is an SEM image of the final product $Ag/SiO_2@cTiO_2$.
Figure 1E:
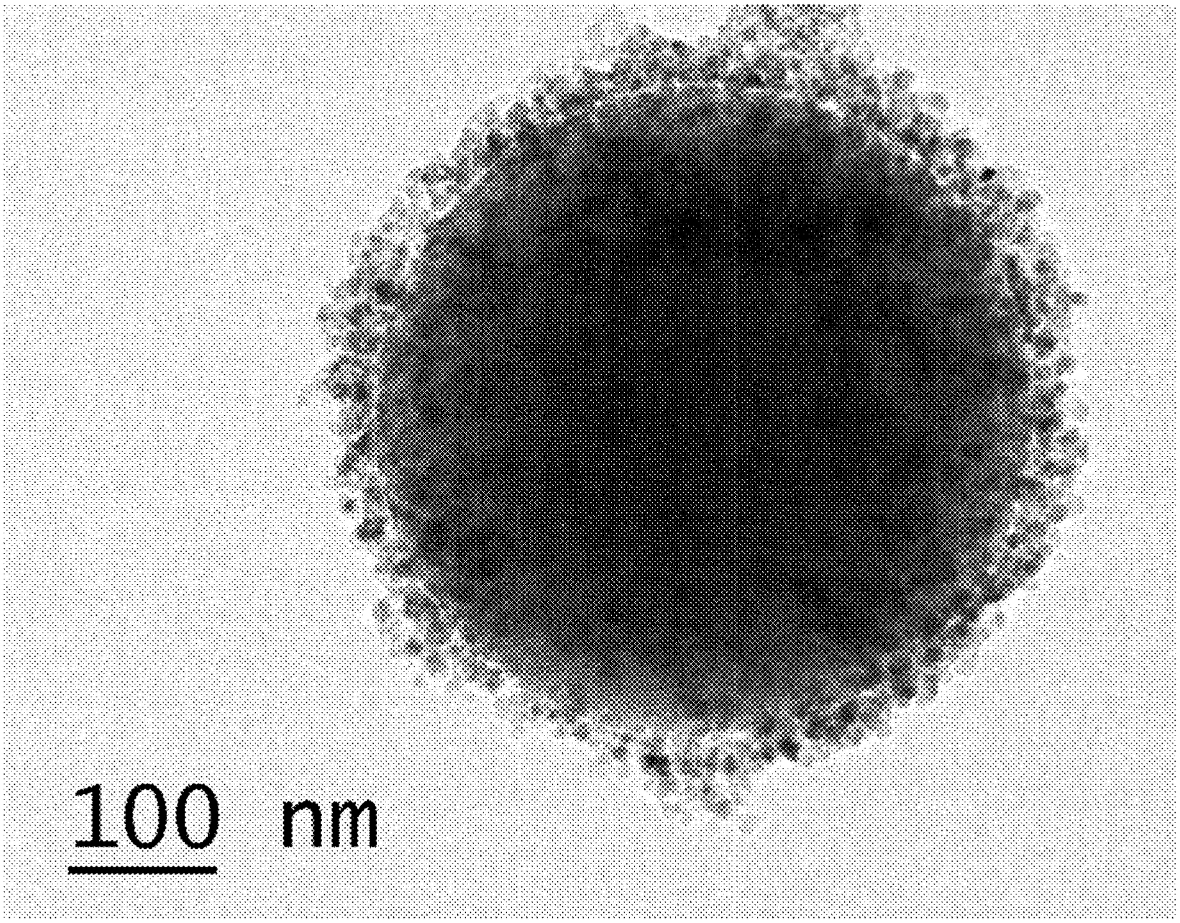
FIG. 1E is a TEM image of the final product $Ag/SiO_2@cTiO_2$.

The present disclosure will be further described below in conjunction with specific examples.

Example 1

In this example, a preparation method of a photocatalytic material for efficient photocatalytic removal of a high-concentration nitrate was provided, including the following steps:

Step 1: preparation of a citrate-stabilized silver nanoparticle: 8 mL of a 40 mmol·$L^{-1}$ sodium citrate solution was added as a stabilizer to 100 mL of a 1 mmol·$L^{-1}$ silver nitrate solution; 2 mL of a 112 mmol·$L^{-1}$ $NaBH_4$ solution was added dropwise to a resulting mixed solution at room temperature, and a resulting mixture was vigorously stirred (1,000 rpm to 1,400 rpm) to obtain a yellow-brown silver nanoparticle colloid solution; and the yellow-brown silver nanoparticle colloid solution was stored in a 4° C. refrigerator and allowed to stand for 24 h to allow decomposition of residual $NaBH_4$ for later use.

Step 2: synthesis and functionalization modification of $SiO_2$: 0.6 mL of TEOS was added dropwise to a mixed solution of 25 mL of water, 15 mL of ammonia water, and 60 mL of IPA, and a resulting mixture was vigorously stirred (1,000 rpm to 1,400 rpm) in a 35° C. water bath to allow a reaction for 30 minutes to obtain a silicon dioxide seed; then 5 mL of TEOS was added dropwise to a resulting reaction system to allow a reaction for 2 h, and a resulting product was collected through centrifugation, washed, and dried to obtain a $SiO_2$ microsphere. In order to make a surface of $SiO_2$ positively charged, 0.4 g of the synthesized $SiO_2$ was ultrasonically dispersed in 200 mL of ethanol, then 2 mL of APTES was added, and a resulting mixture was stirred in a 60° C. water bath for 4 h; and a product was collected through centrifugation, repeatedly washed with ethanol, and dried to obtain APTES-$SiO_2$.

Step 3: preparation of Ag/$SiO_2$: 0.2 g of APTES-$SiO_2$ was dispersed in 400 mL of deionized water, then 20 mL of a 0.1 mg·$L^{-1}$ silver nanoparticle colloid solution (which was obtained by diluting the silver nanoparticle colloid solution obtained in step 1) was added dropwise, and a resulting mixture was vigorously stirred for 1 h (1,000 rpm to 1,400 rpm); and finally a product was collected through suction filtration, washed, and dried to obtain 1 wt % Ag/$SiO_2$.

An amount of the silver nanoparticle colloid solution could be changed to obtain $SiO_2$ samples loaded with Ag in different proportions. A volume ratio of the silver nanoparticle colloid solution to the deionized water was (1-10):40. In this example, 0.5 wt %, 2 wt %, and 5 wt % Ag/$SiO_2$ samples were prepared by changing the amount of the silver nanoparticle colloid solution.

Step 4: preparation of an Ag/$SiO_2$@c$TiO_2$ core-shell structure: 0.08 g of Ag/$SiO_2$ was ultrasonically dispersed in 10 mL of ethanol uniformly, 0.08 g of HDA and 0.2 mL of ammonia water were added, and a resulting mixture was stirred at room temperature for uniform dispersion, during which 0.2 mL of titanium isopropoxide was added to allow a reaction for 10 minutes; the Ag/$SiO_2$@a$TiO_2$ with an amorphous titanium dioxide shell was collected through centrifugation, and then washed three times with each of water and ethanol;

in order to prepare Ag/$SiO_2$@c$TiO_2$ with a mesoporous structure and a crystalline $TiO_2$ shell, the Ag/$SiO_2$@a$TiO_2$ sphere was subjected to a hydrothermal treatment as follows: Ag/$SiO_2$@a$TiO_2$ (0.02 g) was dispersed in a mixed solution of 20 mL of ethanol and 10 mL of water, a resulting solution was then transferred to a stainless-steel high-pressure reactor lined with PTFE, and the reactor was placed in a high-temperature oven to allow a reaction at 160° C. for 16 h; and the reactor was cooled to room temperature, and a product was collected through centrifugation, washed, dried, and finally subjected to calcination at 450° C. for 2 h in a muffle furnace to obtain Ag/$SiO_2$@c$TiO_2$ with a mesoporous structure and a crystalline titanium dioxide shell.

The product obtained in each step was characterized by SEM and TEM. It can be seen from FIGS. 1A-1E that the Ag nanoparticles and $SiO_2$ are dispersed and have average particle sizes of 6.7 nm and 420 nm, respectively; the Ag nanoparticles can be uniformly distributed on a surface of $SiO_2$; and after the hydrothermal and calcination treatments, an anatase titanium oxide shell with a rough and porous surface is obtained.

Figure 2:
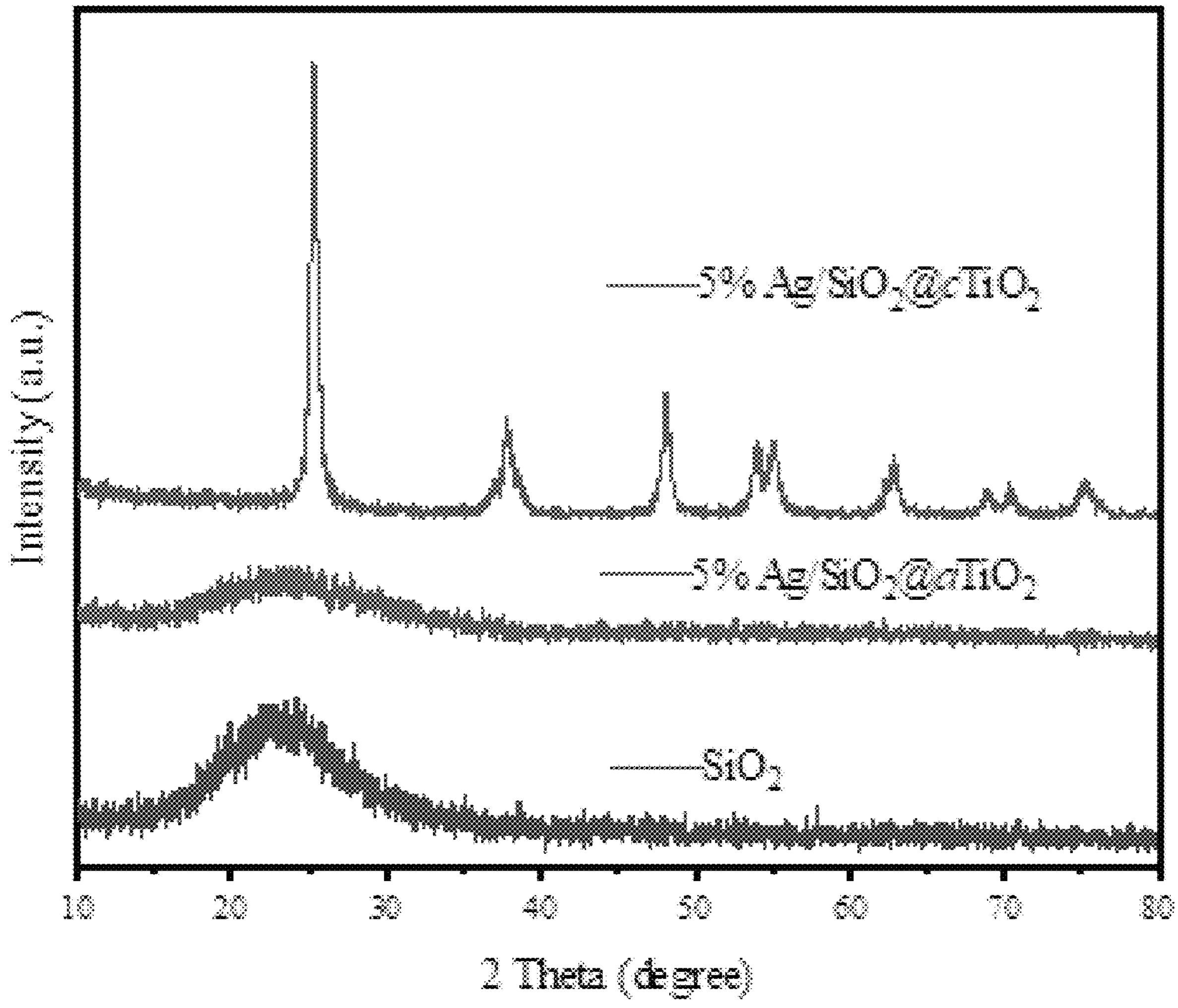
FIG. 2 shows X-ray diffraction (XRD) patterns of $SiO_2$, 5% $Ag/SiO_2@aTiO_2$, and 5% $Ag/SiO_2@cTiO_2$.

It can be seen from FIG. 2 that $SiO_2$ and 5% Ag/$SiO_2$@a$TiO_2$ (amorphous) samples have similar XRD patterns, in which there is a wide peak at about 230 corresponding to amorphous silicon dioxide; and in the XRD pattern of 5% Ag/$SiO_2$@a$TiO_2$ (amorphous), the intensity of the diffraction peak of silicon dioxide is weakened and the characteristic peak of $TiO_2$ does not appear, which is due to the coverage of the amorphous $TiO_2$ shell. The 5% Ag/$SiO_2$@c$TiO_2$ (crystal) obtained after hydrothermal and calcination treatments has a $TiO_2$ shell with excellent crystallinity, and in its XRD pattern, an obvious characteristic peak of the anatase crystal appears.

Figure 3:
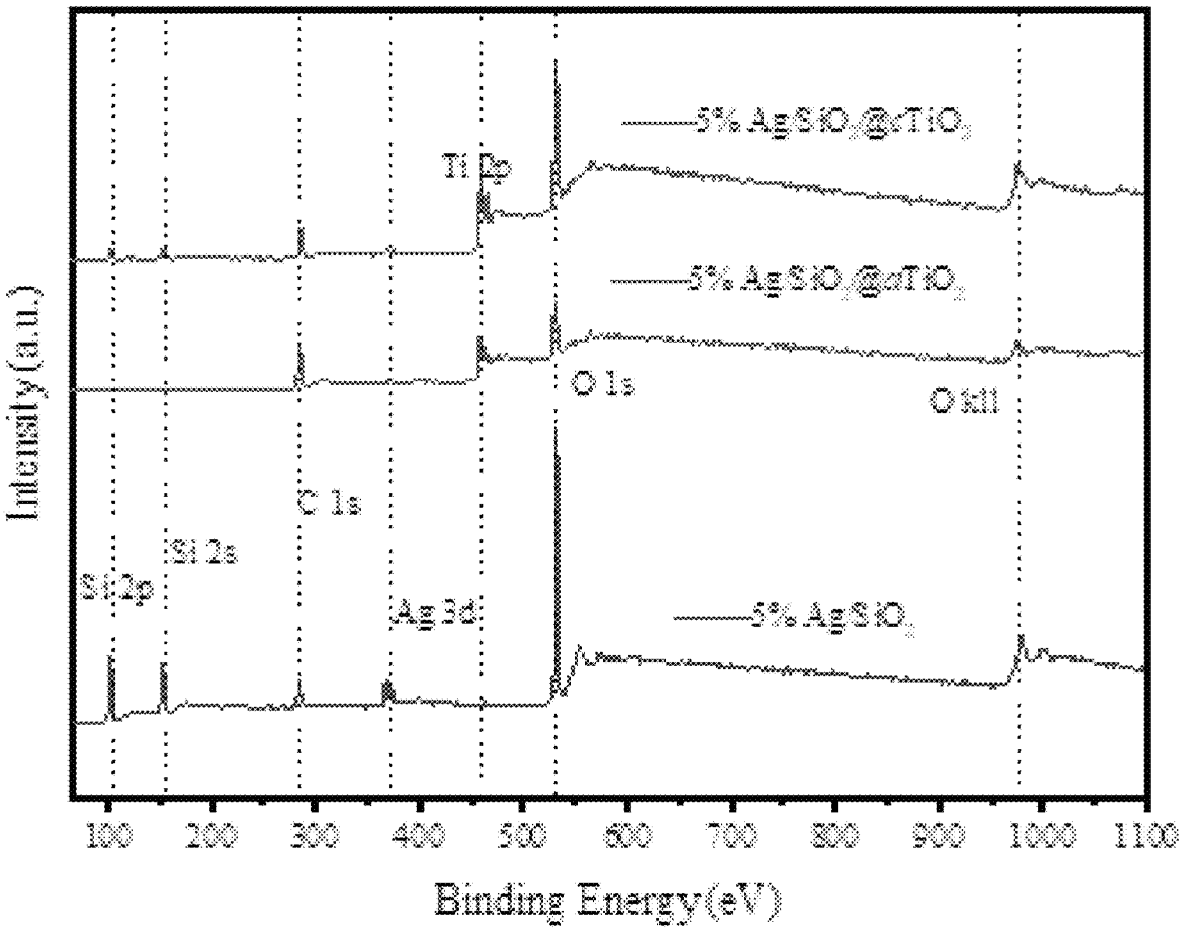
FIG. 3 shows X-ray photoelectron spectroscopy (XPS) spectra of $SiO_2$, 5% $Ag/SiO_2@aTiO_2$, and 5% $Ag/SiO_2@cTiO_2$.

It can be seen from the XPS full spectra (FIG. 3) of 5% Ag/$SiO_2$, 5% Ag/$SiO_2$@a$TiO_2$, and 5% Ag/$SiO_2$@c$TiO_2$ (crystal) that the electron binding energy values of 103.5 eV, 153.4 eV, 284.4 eV, 368 eV, 460.1 eV, 531.1 eV, and 974.8 eV correspond to the characteristic peaks of Si 2P, Si 2s, C Is, Ag 3d, Ti 2p, and O 1s energy levels and the Auger peak of 0, respectively. After a $TiO_2$ layer is coated on a surface of 5% Ag/$SiO_2$, the characteristic peak of the Ti 2p energy level appears in the XPS spectra of 5% Ag/$SiO_2$@a$TiO_2$ and 5% Ag/$SiO_2$@c$TiO_2$. Since 5% Ag/$SiO_2$@a$TiO_2$ has an additional amorphous $TiO_2$ shell compared with 5% Ag/$SiO_2$, the characteristic peaks corresponding to the 2p and 2s energy levels of Si and the 3d energy level of Ag are weak and can hardly be observed in the XPS full spectrum; and the characteristic peaks of Si appear in the XPS spectrum of 5% $Ag/SiO_2@cTiO_2$ obtained after the hydrothermal and calcination treatments, which is due to the fact that the HDA surfactant in the $TiO_2$ shell is completely cleared after the hydrothermal and calcination treatments to form a rough and porous structure in the smooth $TiO_2$ shell, thereby weakening the coverage of $SiO_2$.

Figure 4:
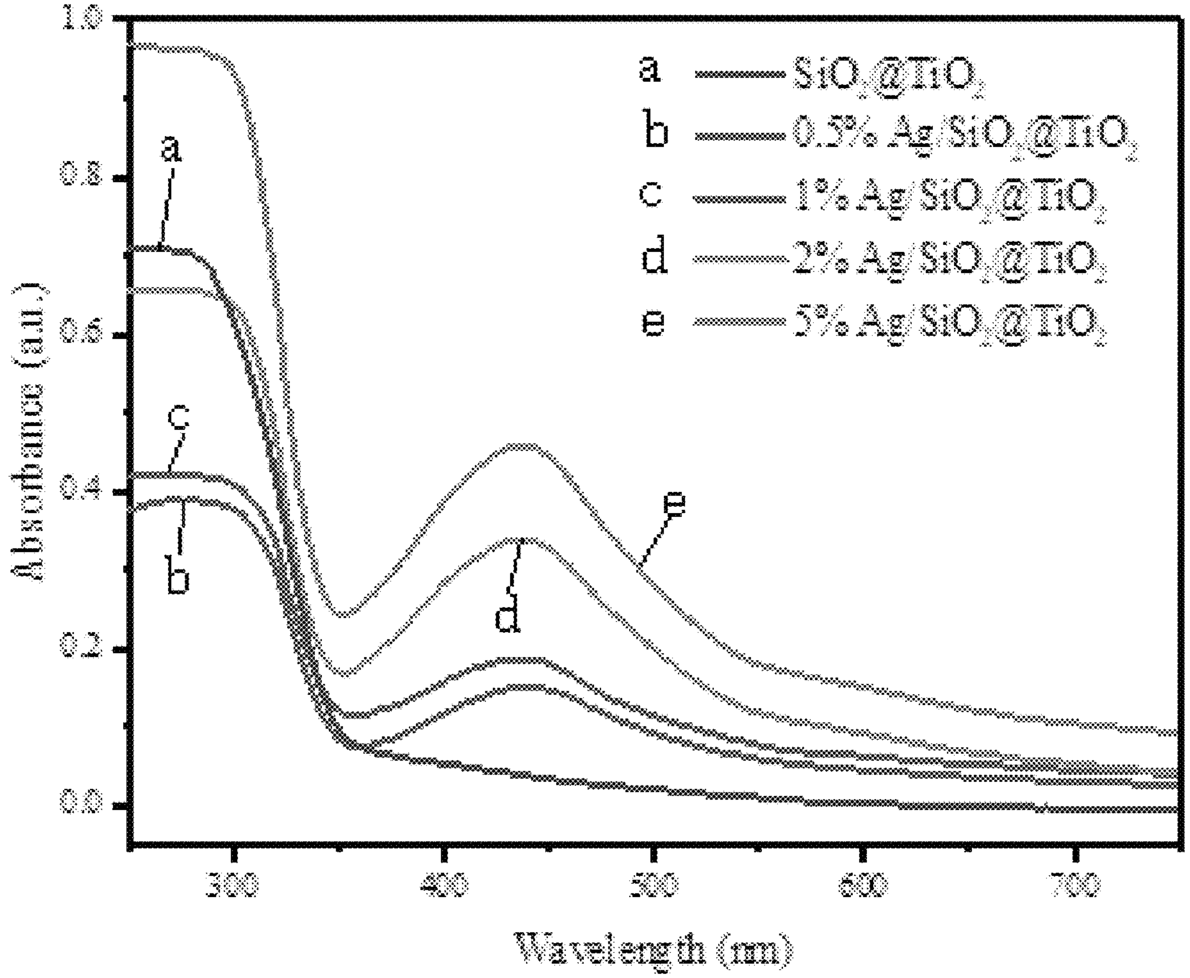
FIG. 4 shows ultraviolet-visible (UV-vis) absorption spectra of $SiO_2$ and $Ag/SiO_2@cTiO_2$ samples with different Ag nanoparticle contents.

FIG. 4 shows UV-vis diffuse reflection spectra. When no Ag nanoparticle is loaded, no absorption peak for $SiO_2@TiO_2$ appears at 400 nm to 500 nm. However, when silver is loaded at different contents, an obvious absorption peak for $Ag/SiO_2@cTiO_2$ appears at 437 nm, and an intensity of the absorption peak is almost increased linearly with the increase in Ag content.

Figure 5A:
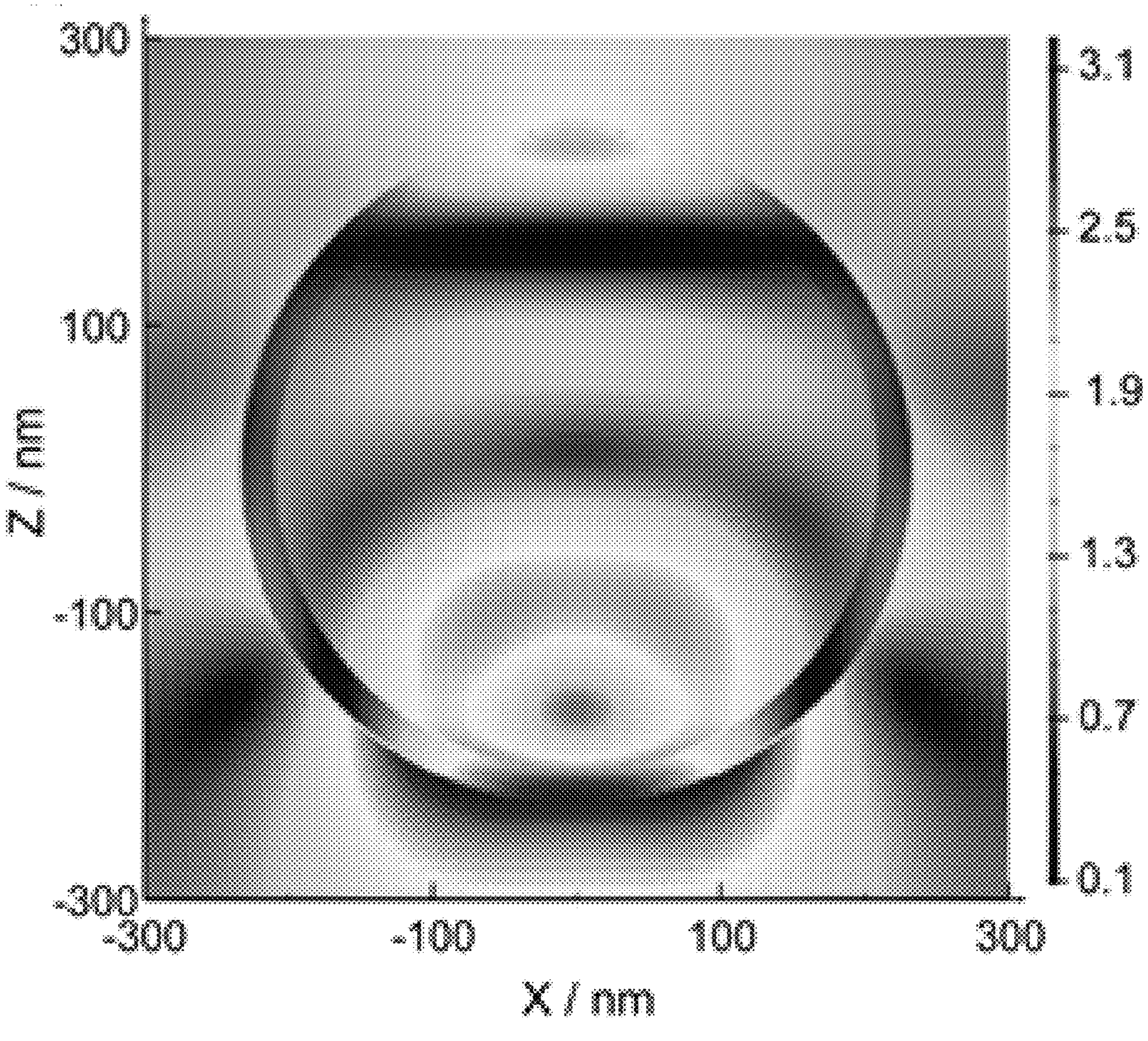
FIG. 5A and FIG. 5B show spatial electric field distributions of $SiO_2$@c$TiO_2$ ($SiO_2$-coated crystal $TiO_2$ without an Ag load) and Ag/$SiO_2$@c$TiO_2$ calculated by a 3D time-domain finite-difference method, respectively.
Figure 5B:
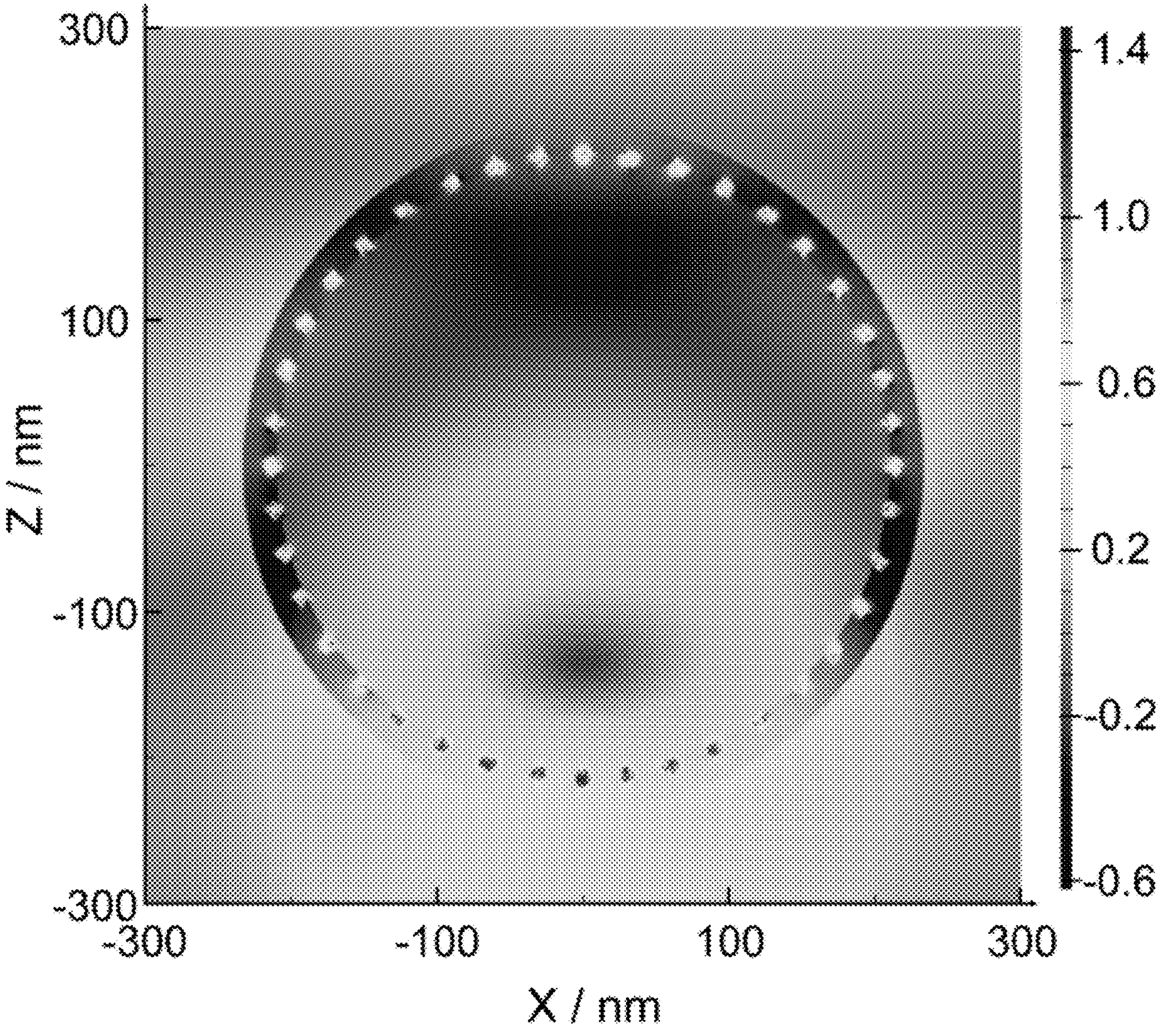

FIG. 5A and FIG. 5B show spatial electric field distributions of $SiO_2@cTiO_2$ ($SiO_2$-coated crystal $TiO_2$ without an Ag load) and $Ag/SiO_2@cTiO_2$ calculated by a 3D time-domain finite-difference method, respectively. In FIG. 5A, 365 nm linear polarized light is injected along the Z axis, and it can be seen that an electric field intensity at an interface between silicon dioxide and titanium dioxide increases significantly, indicating that the light scattering effect enhances the capture of light, the excitation at the core-shell interface is enhanced, and the frontier electron density is increased. In FIG. 5B, 425 nm linear polarized light is injected along the Z axis, and it can be seen that Ag nanoparticles at the core-shell interface are excited by SPR to produce an obvious thermal field, indicating that the light scattering effect of the core-shell model improves the light capture efficiency of Ag/and $SiO_2@cTiO_2$, promotes the SPR excitation for Ag nanoparticles, and enhances the electron density on the surface of the catalyst.

Example 2

In this example, a preparation method of a photocatalytic material for efficient photocatalytic removal of a high-concentration nitrate was provided, including the following steps:

Step 1: preparation of a citrate-stabilized silver nanoparticle: 8 mL of a 40 $mmol \cdot L^1$ sodium citrate solution was added as a stabilizer to 100 mL of a 1 $mmol \cdot L^{-1}$ silver nitrate solution; 2 mL of a 112 $mmol \cdot L^{-1}$ $NaBH_4$ solution was added dropwise to a resulting mixed solution at room temperature, and a resulting mixture was vigorously stirred (1,000 rpm to 1,400 rpm) to obtain a yellow-brown silver nanoparticle colloid solution; and the yellow-brown silver nanoparticle colloid solution was stored in a 4° C. refrigerator and allowed to stand for 24 h to allow decomposition of residual $NaBH_4$ for later use.

Step 2: synthesis and functionalization modification of $SiO_2$: 0.6 mL of TEOS was added dropwise to a mixed solution of 25 mL of water, 15 mL of ammonia water, and 60 mL of IPA, and a resulting mixture was vigorously stirred (1,000 rpm to 1,400 rpm) in a 35° C. water bath to allow a reaction for 30 minutes to obtain a silicon dioxide seed; then 5 mL of TEOS was added dropwise to a resulting reaction system to allow a reaction for 2 h, and a resulting product was collected through centrifugation, washed, and dried to obtain a $SiO_2$ microsphere; in order to make a surface of $SiO_2$ positively charged, 0.4 g of the synthesized $SiO_2$ was ultrasonically dispersed in 200 mL of ethanol, then 2 mL of APTES was added, and a resulting mixture was stirred in a 60° C. water bath for 4 h; and a product was collected through centrifugation, repeatedly washed with ethanol, and dried to obtain APTES-$SiO_2$.

Step 3: preparation of $Ag/SiO_2$: 0.2 g of APTES-$SiO_2$ was dispersed in 400 mL of deionized water, then 20 mL of a 0.1 mg $L^1$ silver nanoparticle colloid solution (which was obtained by diluting the silver nanoparticle colloid solution obtained in step 1) was added dropwise, and a resulting mixture was vigorously stirred for 1 h (1,000 rpm to 1,400 rpm); and finally a product was collected through suction filtration, washed, and dried to obtain 1 wt % $Ag/SiO_2$.

An amount of the silver nanoparticle colloid solution could be changed to obtain $SiO_2$ samples loaded with Ag in different proportions. A volume ratio of the silver nanoparticle colloid solution to the deionized water was (1-10):40. In this example, 0.5 wt %, 2 wt %, and 5 wt % Ag/SiO2 samples were prepared by changing the amount of the silver nanoparticle colloid solution.

Step 4: preparation of an $Ag/SiO_2@cTiO_2$ core-shell structure: 0.08 g of $Ag/SiO_2$ was ultrasonically dispersed in 10 mL of ethanol uniformly, 0.08 g of HDA and 0.2 mL of ammonia water were added, and a resulting mixture was stirred at room temperature for uniform dispersion, during which 0.2 mL of titanium isopropoxide was added to allow a reaction for 10 minutes; the Ag/SiO2@aTiO2 with an amorphous titanium dioxide shell was collected through centrifugation, and then washed three times with each of water and ethanol;

in order to prepare $Ag/SiO_2@cTiO_2$ with a mesoporous structure and a crystalline $TiO_2$ shell, the $Ag/SiO_2@aTiO_2$ sphere was subjected to a hydrothermal treatment as follows: $Ag/SiO_2@aTiO_2$ (0.02 g) was dispersed in a mixed solution of 20 mL of ethanol and 10 mL of water, a resulting solution was then transferred to a stainless-steel high-pressure reactor lined with PTFE, and the reactor was placed in a high-temperature oven to allow a reaction at 160° C. for 16 h; and the reactor was cooled to room temperature, and a product was collected through centrifugation, washed, dried, and finally subjected to calcination at 450° C. for 2 h in a muffle furnace to obtain $Ag/SiO_2@cTiO_2$ with a mesoporous structure and a crystalline titanium dioxide shell.

The photocatalytic material prepared by the above method was used for removing a nitrate ion in water through photocatalytic reduction as follows: 50 mL (100 mg/L) of a low-concentration nitrate as a target pollutant and 1 mL of formic acid (0.4 mol $L^{-1}$) as a sacrifice agent were added to a photocatalytic reactor; a series of catalysts were subjected to parallel contrast experiments, with a catalyst feed amount of 0.5 g $L^{-1}$; a reaction system was stirred for 30 minutes before light irradiation to achieve an adsorption equilibrium; the UV lamp was turned on for irradiation, and then a temperature of the reactor was kept at about 25° C. by a circulating water bath; and a reaction was conducted for 100 minutes.

Figure 6:
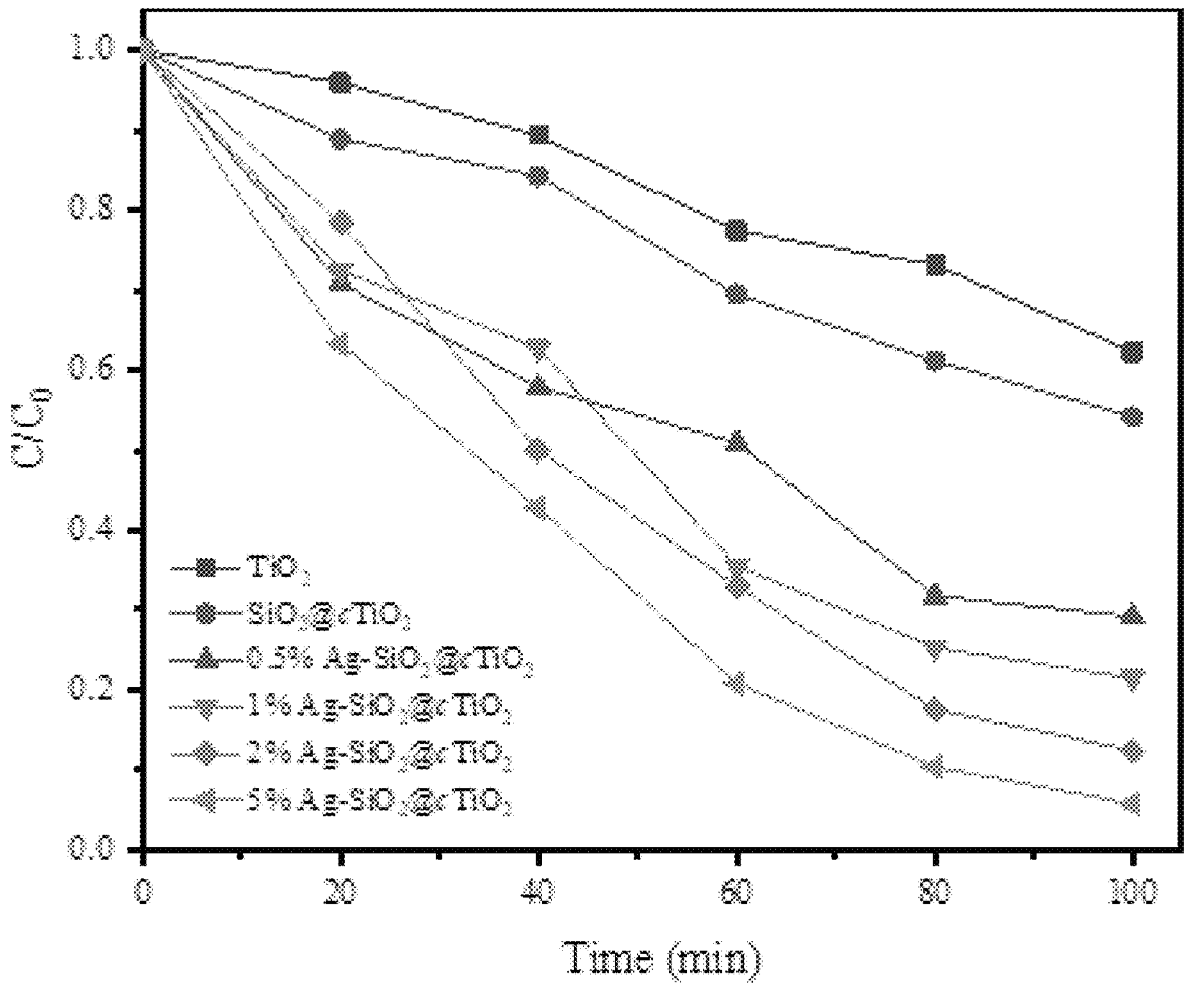
FIG. 6 shows photocatalytic reduction effects of various catalysts for a low-concentration nitrate ion (100 mg/L) in Example 2.

Removal effects for the nitrate were shown in FIG. 6. The ordinary $TiO_2$ has a poor reduction effect for $NO_3^-$, and after 100 minutes of a photocatalytic reduction reaction, a removal rate is less than 40%. After $TiO_2$ is prepared into a $SiO_2@TiO_2$ core-shell structure, a photocatalytic conversion rate of the nitrate is improved due to the improvement of the light absorption and utilization efficiency by the core-shell structure. After the Ag nanoparticle is further introduced into the $Ag/SiO_2@TiO_2$ system, photocatalytic reduction effects of $Ag/SiO_2@TiO_2$ with different silver loads for the nitrate are greatly improved, and a degree of improvement is positively correlated with the load of Ag. 5% $Ag/SiO_2@TiO_2$ has the highest photocatalytic activity and exhibits a removal rate as high as 94.2% for the nitrate.

Example 3

In this example, a preparation method of a photocatalytic material for efficient photocatalytic removal of a high-concentration nitrate was provided, including the following steps:

Step 1: preparation of a citrate-stabilized silver nanoparticle: 8 mL of a 40 mmol·$L^{-1}$ sodium citrate solution was added as a stabilizer to 100 mL of a 1 mmol·$L^{-1}$ silver nitrate solution; 2 mL of a 112 mmol·$L^{-1}$ $NaBH_4$ solution was added dropwise to a resulting mixed solution at room temperature, and a resulting mixture was vigorously stirred (1,000 rpm to 1,400 rpm) to obtain a yellow-brown silver nanoparticle colloid solution; and the yellow-brown silver nanoparticle colloid solution was stored in a 4° C. refrigerator and allowed to stand for 24 h to allow decomposition of residual $NaBH_4$ for later use.

Step 2: synthesis and functionalization modification of $SiO_2$: 0.6 mL of TEOS was added dropwise to a mixed solution of 25 mL of water, 15 mL of ammonia water, and 60 mL of IPA, and a resulting mixture was vigorously stirred (1,000 rpm to 1,400 rpm) in a 35° C. water bath to allow a reaction for 30 minutes to obtain a silicon dioxide seed; then 5 mL of TEOS was added dropwise to a resulting reaction system to allow a reaction for 2 h, and a resulting product was collected through centrifugation, washed, and dried to obtain a $SiO_2$ microsphere; in order to make a surface of $SiO_2$ positively charged, 0.4 g of the synthesized $SiO_2$ was ultrasonically dispersed in 200 mL of ethanol, then 2 mL of APTES was added, and a resulting mixture was stirred in a 60° C. water bath for 4 h; and a product was collected through centrifugation, repeatedly washed with ethanol, and dried to obtain APTES-$SiO_2$.

Step 3: preparation of Ag/$SiO_2$: 0.2 g of APTES-$SiO_2$ was dispersed in 400 mL of deionized water, then 20 mL of a 0.1 mg $L^{-1}$ silver nanoparticle colloid solution (which was obtained by diluting the silver nanoparticle colloid solution obtained in step 1) was added dropwise, and a resulting mixture was vigorously stirred for 1 h (1,000 rpm to 1,400 rpm); and finally a product was collected through suction filtration, washed, and dried to obtain 1 wt % Ag/$SiO_2$.

An amount of the silver nanoparticle colloid solution could be changed to obtain $SiO_2$ samples loaded with Ag in different proportions. A volume ratio of the silver nanoparticle colloid solution to the deionized water was (1-10):40. In this example, 0.5 wt %, 2 wt %, and 5 wt % Ag/$SiO_2$ samples were prepared by changing the amount of the silver nanoparticle colloid solution.

Step 4: preparation of an Ag/$SiO_2$@c$TiO_2$ core-shell structure: 0.08 g of Ag/$SiO_2$ was ultrasonically dispersed in 10 mL of ethanol uniformly, 0.08 g of HDA and 0.2 mL of ammonia water were added, and a resulting mixture was stirred at room temperature for uniform dispersion, during which 0.2 mL of titanium isopropoxide was added to allow a reaction for 10 minutes; the Ag/SiO2@aTiO2 with an amorphous titanium dioxide shell was collected through centrifugation, and then washed three times with each of water and ethanol;

in order to prepare Ag/$SiO_2$@c$TiO_2$ with a mesoporous structure and a crystalline $TiO_2$ shell, the Ag/$SiO_2$@a$TiO_2$ sphere was subjected to a hydrothermal treatment as follows: Ag/$SiO_2$@a$TiO_2$ (0.02 g) was dispersed in a mixed solution of 20 mL of ethanol and 10 mL of water, a resulting solution was then transferred to a stainless-steel high-pressure reactor lined with PTFE, and the reactor was placed in a high-temperature oven to allow a reaction at 160° C. for 16 h; and the reactor was cooled to room temperature, and a product was collected through centrifugation, washed, dried, and finally subjected to calcination at 450° C. for 2 h in a muffle furnace to obtain Ag/$SiO_2$@c$TiO_2$ with a mesoporous structure and a crystalline titanium dioxide shell.

The photocatalytic material prepared by the above method was used to remove a nitrate ion in water through photocatalytic reduction as follows: 50 mL of a high-concentration nitrate (2,000 mg/L) as a target pollutant and 2 mL of formic acid (4 mol $L^{-1}$) as a sacrifice agent were added to a photocatalytic reactor; 5% Ag/$SiO_2$@c$TiO_2$ was fed as a catalyst at an amount of 0.5 g $L^{-1}$; a reaction system was stirred for 30 minutes before light irradiation to achieve an adsorption equilibrium; the UV lamp was turned on for irradiation, and then a temperature of the reactor was kept at about 25° C. by a circulating water bath; and a reaction was conducted for 4 h.

Figure 7:
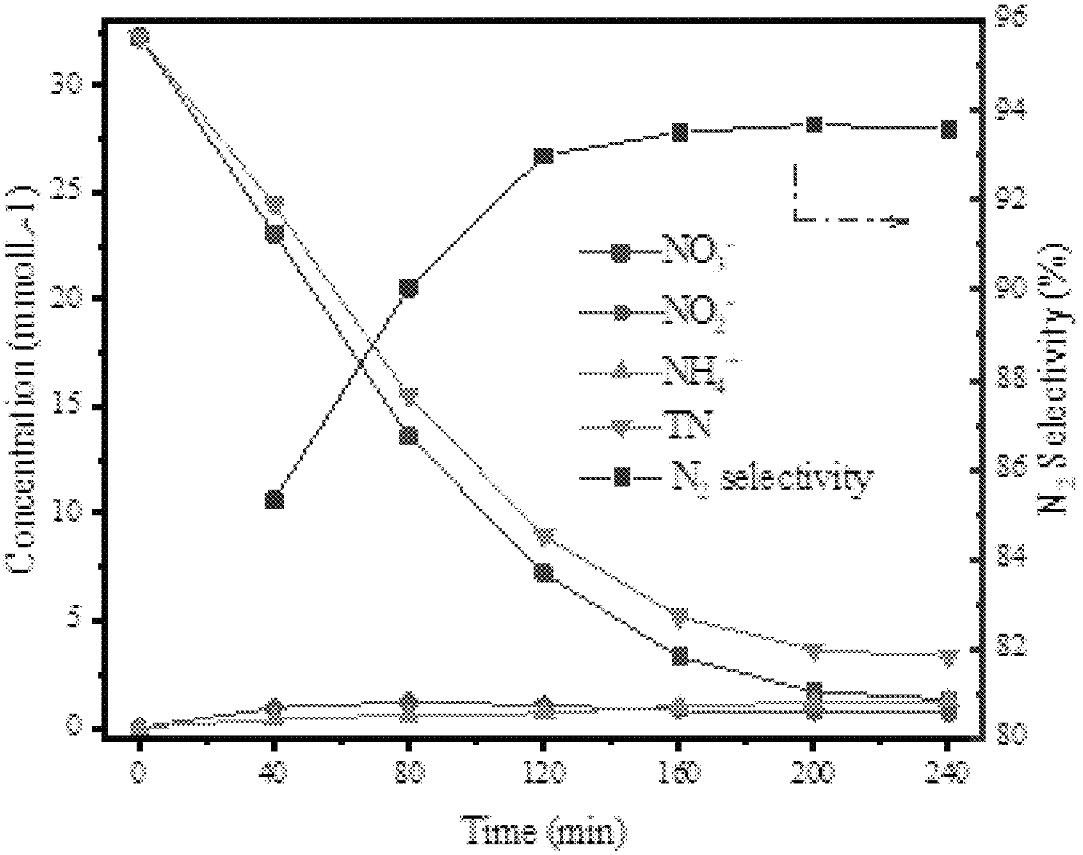
FIG. 7 shows the changes in nitrogen-containing product concentrations and nitrogen selectivity during photocatalytic reduction of various catalysts for a high-concentration nitrate ion (2,000 mg/L) in Example 3.

The changes in nitrogen-containing components and nitrogen selectivity during a nitrate removal process were shown in FIG. 7. After 4 h of a reaction, a removal rate of 5% Ag/$SiO_2$@c$TiO_2$ for 2,000 mg/L $NO_3^-$ reaches 95.8%, and due to the rapid reduction of $NO_3^-$, $NO_2$ accumulates as a main intermediate in large quantities at an early stage of the reaction and then is reduced. The concentration of $NH_4^-$ is low, but is always increasing, which is mainly attributed to the reduction of $NO_3^-$ and $NO_2$—. The formation of intermediates such as $N_2O$ and $N_2O_5$ during a nitrate reduction process makes the total nitrogen content slightly higher than a nitrate nitrogen content, but given the low yields of these intermediates, their influence is negligible. Due to the decrease of a reaction rate at a later stage of the reaction, a conversion rate of $N_2$ is reduced, such that the $N_2$ selectivity shows a trend of first increasing and then decreasing, and finally reaches 93.6%.

Example 4

In this example, a preparation method of a photocatalytic material for efficient photocatalytic removal of a high-concentration nitrate was provided, including the following steps:

Step 1: preparation of a citrate-stabilized silver nanoparticle: 8 mL of a 40 mmol·$L^1$ sodium citrate solution was added as a stabilizer to 100 mL of a 1 mmol·$L^{-1}$ silver nitrate solution; 2 mL of a 112 mmol·$L^{-1}$ $NaBH_4$ solution was added dropwise to a resulting mixed solution at room temperature, and a resulting mixture was vigorously stirred (1,000 rpm to 1,400 rpm) to obtain a yellow-brown silver nanoparticle colloid solution; and the yellow-brown silver nanoparticle colloid solution was stored in a 4° C. refrigerator and allowed to stand for 24 h to allow decomposition of residual $NaBH_4$ for later use.

Step 2: synthesis and functionalization modification of $SiO_2$: 0.6 mL of TEOS was added dropwise to a mixed solution of 25 mL of water, 15 mL of ammonia water, and 60 mL of IPA, and a resulting mixture was vigorously stirred (1,000 rpm to 1,400 rpm) in a 35° C. water bath to allow a reaction for 30 minutes to obtain a silicon dioxide seed; then 5 mL of TEOS was added dropwise to a resulting reaction system to allow a reaction for 2 h, and a resulting product was collected through centrifugation, washed, and dried to obtain a $SiO_2$ microsphere; in order to make a surface of $SiO_2$ positively charged, 0.4 g of the synthesized $SiO_2$ was ultrasonically dispersed in 200 mL of ethanol, then 2 mL of APTES was added, and a resulting mixture was stirred in a 60° C. water bath for 4 h; and a product was collected through centrifugation, repeatedly washed with ethanol, and dried to obtain APTES-$SiO_2$.

Step 3: preparation of Ag/$SiO_2$: 0.2 g of APTES-$SiO_2$ was dispersed in 400 mL of deionized water, then 20 mL of a 0.1 mg $L^{-1}$ silver nanoparticle colloid solution (which was obtained by diluting the silver nanoparticle colloid solution obtained in step 1) was added dropwise, and a resulting mixture was vigorously stirred for 1 h (1,000 rpm to 1,400 rpm); and finally a product was collected through suction filtration, washed, and dried to obtain 1 wt % Ag/$SiO_2$.

An amount of the silver nanoparticle colloid solution could be changed to obtain $SiO_2$ samples loaded with Ag in different proportions. A volume ratio of the silver nanoparticle colloid solution to the deionized water was (1-10):40. In this example, 0.5 wt %, 2 wt %, and 5 wt % Ag/$SiO_2$ samples were prepared by changing the amount of the silver nanoparticle colloid solution. Step 4: preparation of an Ag/$SiO_2$@c$TiO_2$ core-shell structure: 0.08 g of Ag/$SiO_2$ was ultrasonically dispersed in 10 mL of ethanol uniformly, 0.08 g of HDA and 0.2 mL of ammonia water were added, and a resulting mixture was stirred at room temperature for uniform dispersion, during which 0.2 mL of titanium isopropoxide was added to allow a reaction for 10 minutes; the Ag/SiO2@aTiO2 with an amorphous titanium dioxide shell was collected through centrifugation, and then washed three times with each of water and ethanol;

in order to prepare Ag/$SiO_2$@c$TiO_2$ with a mesoporous structure and a crystalline $TiO_2$ shell, the Ag/$SiO_2$@a$TiO_2$ sphere was subjected to a hydrothermal treatment as follows: Ag/$SiO_2$@a$TiO_2$ (0.02 g) was dispersed in a mixed solution of 20 mL of ethanol and 10 mL of water, a resulting solution was then transferred to a stainless-steel high-pressure reactor lined with PTFE, and the reactor was placed in a high-temperature oven to allow a reaction at 160° C. for 16 h; and the reactor was cooled to room temperature, and a product was collected through centrifugation, washed, dried, and finally subjected to calcination at 450° C. for 2 h in a muffle furnace to obtain Ag/$SiO_2$@c$TiO_2$ with a mesoporous structure and a crystalline titanium dioxide shell.

The photocatalytic material prepared by the above method was used to remove a nitrate ion in water through photocatalytic reduction as follows: 50 mL of a high-concentration nitrate (2,000 mg/L) as a target pollutant and 2 mL of formic acid (4 mol $L^{-1}$) as a sacrifice agent were added to a photocatalytic reactor; 5% Ag/$SiO_2$@c$TiO_2$ was fed as a catalyst at an amount of 0.5 g $L^{-1}$; a reaction system was stirred for 30 minutes before light irradiation to achieve an adsorption equilibrium; the UV lamp was turned on for irradiation, and then a temperature of the reactor was kept at about 25° C. by a circulating water bath; a reaction was conducted for 4 h; and after the reaction was completed, the catalyst was washed and recovered for a subsequent-batch recycling experiment.

Figure 8:
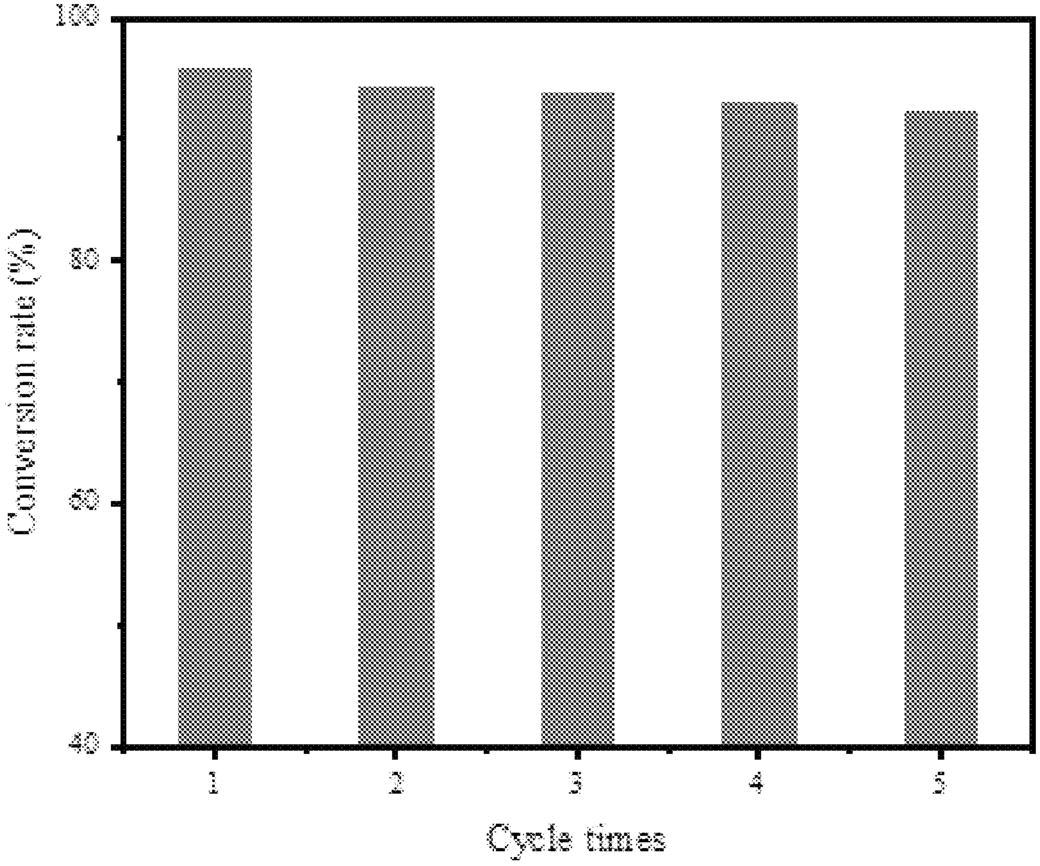
FIG. 8 shows a recycling effect of 5% Ag/$SiO_2$@c$TiO_2$ in reduction of a high-concentration nitrate ion (2,000 mg/L) in Example 4.

As shown in FIG. 8, after five cycles, the removal efficiency of 5% Ag/$SiO_2$@c$TiO_2$ for a high-concentration nitrate is not significantly decreased, and can still reach 92% or more, indicating that the material has excellent stability.

Example 5

In this example, a preparation method of a photocatalytic material for efficient photocatalytic removal of a high-concentration nitrate was provided, including the following steps:

Step 1: preparation of a citrate-stabilized silver nanoparticle: 8 mL of a 40 mmol·$L^{-1}$ sodium citrate solution was added as a stabilizer to 100 mL of a 1 mmol·$L^{-1}$ silver nitrate solution; 2 mL of a 112 mmol·$L^{-1}$ $NaBH_4$ solution was added dropwise to a resulting mixed solution at room temperature, and a resulting mixture was vigorously stirred (1,000 rpm to 1,400 rpm) to obtain a yellow-brown silver nanoparticle colloid solution; and the yellow-brown silver nanoparticle colloid solution was stored in a 4° C. refrigerator and allowed to stand for 24 h to allow decomposition of residual $NaBH_4$ for later use.

Step 2: synthesis and functionalization modification of $SiO_2$: 0.6 mL of TEOS was added dropwise to a mixed solution of 25 mL of water, 15 mL of ammonia water, and 60 mL of IPA, and a resulting mixture was vigorously stirred (1,000 rpm to 1,400 rpm) in a 35° C. water bath to allow a reaction for 30 minutes to obtain a silicon dioxide seed; then 5 mL of TEOS was added dropwise to a resulting reaction system to allow a reaction for 2 h, and a resulting product was collected through centrifugation, washed, and dried to obtain a $SiO_2$ microsphere; in order to make a surface of $SiO_2$ positively charged, 0.4 g of the synthesized $SiO_2$ was ultrasonically dispersed in 200 mL of ethanol, then 2 mL of APTES was added, and a resulting mixture was stirred in a 60° C. water bath for 4 h; and a product was collected through centrifugation, repeatedly washed with ethanol, and dried to obtain APTES-$SiO_2$.

Step 3: preparation of Ag/$SiO_2$: 0.2 g of APTES-$SiO_2$ was dispersed in 400 mL of deionized water, then 20 mL of a 0.1 mg·$L^{-1}$ silver nanoparticle colloid solution (which was obtained by diluting the silver nanoparticle colloid solution obtained in step 1) was added dropwise, and a resulting mixture was vigorously stirred for 1 h (1,000 rpm to 1,400 rpm); and finally a product was collected through suction filtration, washed, and dried to obtain 1 wt % Ag/$SiO_2$.

An amount of the silver nanoparticle colloid solution could be changed to obtain $SiO_2$ samples loaded with Ag in different proportions. A volume ratio of the silver nanoparticle colloid solution to the deionized water was (1-10):40. In this example, 0.5 wt %, 2 wt %, and 5 wt % Ag/$SiO_2$ samples were prepared by changing the amount of the silver nanoparticle colloid solution.

Step 4: preparation of an Ag/$SiO_2$@c$TiO_2$ core-shell structure: 0.08 g of Ag/$SiO_2$ was ultrasonically dispersed in 10 mL of ethanol uniformly, 0.08 g of HDA and 0.2 mL of ammonia water were added, and a resulting mixture was stirred at room temperature for uniform dispersion, during which 0.2 mL of titanium isopropoxide was added to allow a reaction for 10 minutes; the Ag/SiO2@aTiO2 with an amorphous titanium dioxide shell was collected through centrifugation, and then washed three times with each of water and ethanol;

in order to prepare Ag/$SiO_2$@c$TiO_2$ with a mesoporous structure and a crystalline $TiO_2$ shell, the Ag/$SiO_2$@a$TiO_2$ sphere was subjected to a hydrothermal treatment as follows: Ag/$SiO_2$@a$TiO_2$ (0.02 g) was dispersed in a mixed solution of 20 mL of ethanol and 10 mL of water, a resulting solution was then transferred to a stainless-steel high-pressure reactor lined with PTFE, and the reactor was placed in a high-temperature oven to allow a reaction at 160° C. for 16 h; and the reactor was cooled to room temperature, and a product was collected through centrifugation, washed, dried, and finally subjected to calcination at 450° C. for 2 h in a muffle furnace to obtain Ag/$SiO_2$@c$TiO_2$ with a mesoporous structure and a crystalline titanium dioxide shell.

The photocatalytic material prepared by the above method was used to remove a nitrate ion in water through photocatalytic reduction as follows: 50 mL of a high-concentration nitrate (2,000 mg/L) as a target pollutant and 2 mL of formic acid (4 mol $L^{-1}$) as a sacrifice agent were added to a photocatalytic reactor, and 4 wt % to 10 wt % NaCl was added in parallel to the photocatalytic reactor; 5% $Ag/SiO_2$@$cTiO_2$ was fed as a catalyst at an amount of 0.5 g $L^{-1}$; a reaction system was stirred for 30 minutes before light irradiation to achieve an adsorption equilibrium; the UV lamp was turned on for irradiation, and then a temperature of the reactor was kept at about 25° C. by a circulating water bath; and a reaction was conducted for 5.3 h.

Figure 9:
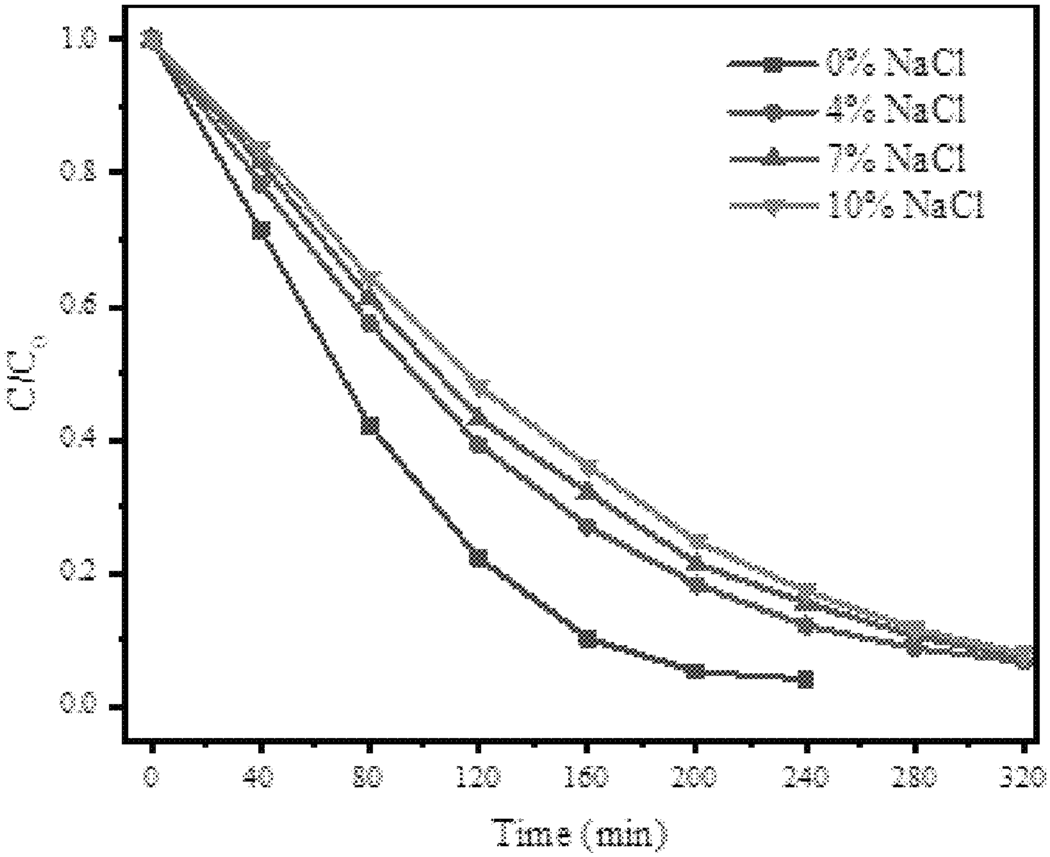
FIG. 9 shows a reduction effect of 5% Ag/$SiO_2$@c$TiO_2$ for a high-concentration nitrate ion (2,000 mg/L) coexisting with a high-concentration chloride ion (NaCl=4 wt % to 10 wt %) in Example 5.
Figure 10:
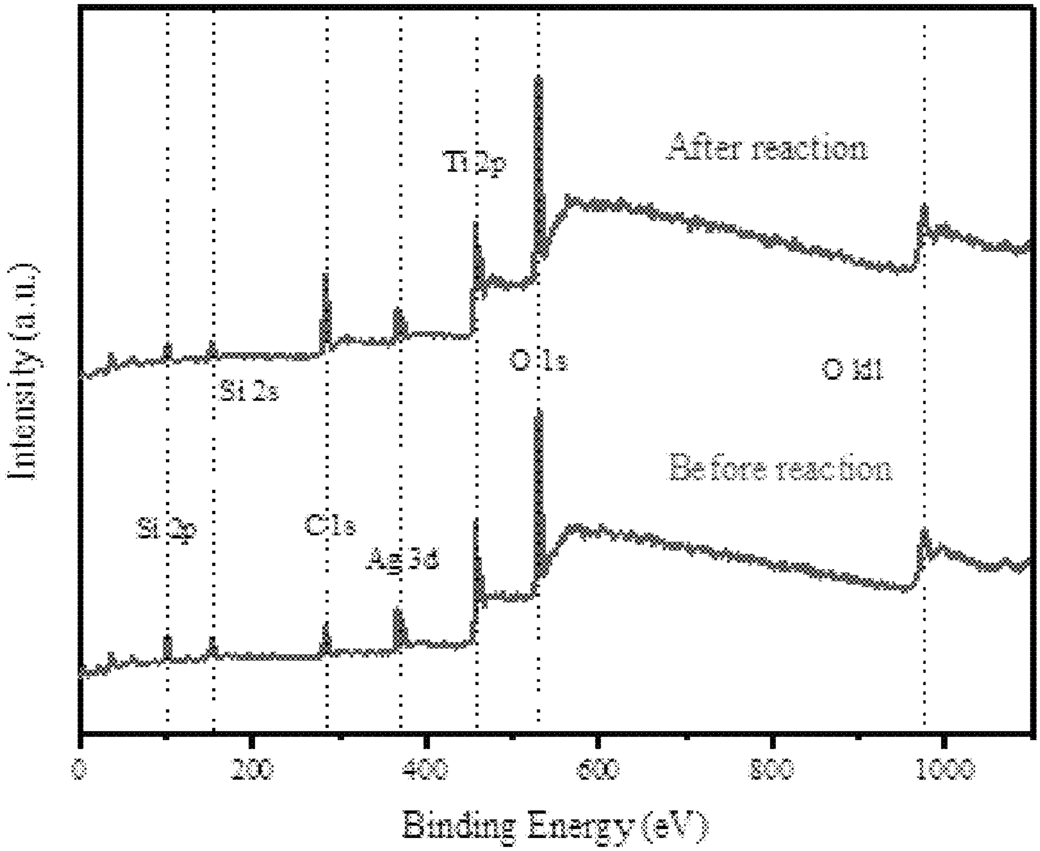
FIG. 10 shows XPS spectra before and after a reaction of 5% Ag/$SiO_2$@c$TiO_2$ in Example 5.

Nitrate removal effects under the interference of a high-concentration chloride ion were shown in FIG. 9. Although the high-concentration chloride ion inhibits a photocatalytic reduction rate of the nitrate, but when the reaction time is extended to 5.3 h, a nitrate removal rate of 92% or more can still be achieved. In addition, XPS spectra before and after the reaction (FIG. 10) show that $Cl^-$ does not contaminate a surface of the catalyst to inactivate the catalyst.

Example 6

In this example, a preparation method of a photocatalytic material for efficient photocatalytic removal of a high-concentration nitrate was provided, including the following steps:

Step 1: preparation of a citrate-stabilized silver nanoparticle: 8 mL of a 40 mmol·$L^1$ sodium citrate solution was added as a stabilizer to 100 mL of a 1 mmol·$L^{-1}$ silver nitrate solution; 2 mL of a 112 mmol·$L^{-1}$ $NaBH_4$ solution was added dropwise to a resulting mixed solution at room temperature, and a resulting mixture was vigorously stirred (1,000 rpm to 1,400 rpm) to obtain a yellow-brown silver nanoparticle colloid solution; and the yellow-brown silver nanoparticle colloid solution was stored in a 4° C. refrigerator and allowed to stand for 24 h to allow decomposition of residual $NaBH_4$ for later use.

Step 2: synthesis and functionalization modification of $SiO_2$: 0.6 mL of TEOS was added dropwise to a mixed solution of 25 mL of water, 15 mL of ammonia water, and 60 mL of IPA, and a resulting mixture was vigorously stirred (1,000 rpm to 1,400 rpm) in a 40° C. water bath to allow a reaction for 30 minutes to obtain a silicon dioxide seed; then 5 mL of TEOS was added dropwise to a resulting reaction system to allow a reaction for 2 h, and a resulting product was collected through centrifugation, washed, and dried to obtain a $SiO_2$ microsphere; in order to make a surface of $SiO_2$ positively charged, 0.4 g of the synthesized $SiO_2$ was ultrasonically dispersed in 200 mL of ethanol, then 2 mL of APTES was added, and a resulting mixture was stirred in a 50° C. water bath for 4 h; and a product was collected through centrifugation, repeatedly washed with ethanol, and dried to obtain APTES-$SiO_2$.

Step 3: preparation of $Ag/SiO_2$: 0.2 g of APTES-$SiO_2$ was dispersed in 400 mL of deionized water, then 20 mL of a 0.1 mg $L^{-1}$ silver nanoparticle colloid solution (which was obtained by diluting the silver nanoparticle colloid solution obtained in step 1) was added dropwise, and a resulting mixture was vigorously stirred for 1 h (1,000 rpm to 1,400 rpm); and finally a product was collected through suction filtration, washed, and dried to obtain 1 wt % $Ag/SiO_2$.

An amount of the silver nanoparticle colloid solution could be changed to obtain $SiO_2$ samples loaded with Ag in different proportions. A volume ratio of the silver nanoparticle colloid solution to the deionized water was (1-10):40. In this example, 0.5 wt %, 2 wt %, and 5 wt % Ag/SiO2 samples were prepared by changing the amount of the silver nanoparticle colloid solution.

Step 4: preparation of an $Ag/SiO_2$@$cTiO_2$ core-shell structure: 0.08 g of $Ag/SiO_2$ was ultrasonically dispersed in 10 mL of ethanol uniformly, 0.08 g of HDA and 0.2 mL of ammonia water were added, and a resulting mixture was stirred at room temperature for uniform dispersion, during which 0.2 mL of titanium isopropoxide was added to allow a reaction for 10 minutes; the Ag/SiO2@aTiO2 with an amorphous titanium dioxide shell was collected through centrifugation, and then washed three times with each of water and ethanol;

in order to prepare $Ag/SiO_2$@$cTiO_2$ with a mesoporous structure and a crystalline $TiO_2$ shell, the $Ag/SiO_2$@$aTiO_2$ sphere was subjected to a hydrothermal treatment as follows: $Ag/SiO_2$@$aTiO_2$ (0.02 g) was dispersed in a mixed solution of 20 mL of ethanol and 10 mL of water, a resulting solution was then transferred to a stainless-steel high-pressure reactor lined with PTFE, and the reactor was placed in a high-temperature oven to allow a reaction at 140° C. for 12 h; and the reactor was cooled to room temperature, and a product was collected through centrifugation, washed, dried, and finally subjected to calcination at 500° C. for 2 h in a muffle furnace to obtain $Ag/SiO_2$@$cTiO_2$ with a mesoporous structure and a crystalline titanium dioxide shell.

In summary, compared with the traditional titanium dioxide, the $Ag/SiO_2$@$cTiO_2$ material prepared by the present disclosure can remove a high-concentration nitrate through efficient photocatalytic reduction, and can still retain high photocatalytic activity and stability even when the nitrate coexists with a high-concentration chloride ion.

What is claimed is:

1. A preparation method of a photocatalytic material for efficient photocatalytic removal of a high-concentration nitrate, comprising the following steps:

step 1: preparation of a citrate-stabilized silver nanoparticle: adding a sodium citrate solution to a silver nitrate solution, adding a sodium borohydride solution dropwise to a resulting mixed solution at room temperature, and stirring to obtain a silver nanoparticle colloid solution;

step 2: synthesis and functionalization modification of $SiO_2$: adding a first tetraethyl orthosilicate (TEOS) dropwise to a first mixed solution of water, ammonia water, and isopropyl alcohol (IPA), stirring a first resulting mixture in a water bath to continue a reaction to obtain a silicon dioxide ($SiO_2$) seed, adding a second TEOS dropwise to a resulting reaction system to allow a first reaction, and conducting a first post-treatment to obtain a $SiO_2$ microsphere;

and ultrasonically dispersing the $SiO_2$ microsphere in ethanol, adding (3-aminopropyl) triethoxysilane (APTES), stirring a second resulting mixture in a water bath, and conducting a second post-treatment to obtain APTES-$SiO_2$;

step 3: preparation of $Ag/SiO_2$: dispersing APTES-$SiO_2$ in deionized water, adding the silver nanoparticle colloid solution dropwise, stirring, and conducting a third post-treatment to obtain $Ag/SiO_2$; and step 4: preparation of an $Ag/SiO_2$@$cTiO_2$ core-shell structure: ultrasonically dispersing $Ag/SiO_2$ uniformly in ethanol, and adding hexadecylamine (HDA) and ammonia water; stirring a third resulting mixture at room temperature for uniform dispersion, during stirring, titanium isopropoxide is added to allow a second reaction; collecting $Ag/SiO_2@aTiO_2$ with an amorphous titanium dioxide shell through centrifugation;

dispersing $Ag/SiO_2@aTiO_2$ in a second mixed solution of ethanol and water, transferring a resulting solution to a reactor, and placing the reactor at a high temperature to allow a third reaction; and after the reaction is completed, cooling the reactor to room temperature, and subjecting a resulting product to a fourth post-treatment and then to calcination to obtain $Ag/SiO_2@cTiO_2$ with a crystalline titanium dioxide shell.

2. The preparation method of the photocatalytic material for efficient photocatalytic removal of the high-concentration nitrate according to claim 1, wherein in step 1, the sodium borohydride solution, the sodium citrate solution, and the silver nitrate solution are in a volume ratio of 1:4:50 and in a concentration ratio of 112:40:1.

3. The preparation method of the photocatalytic material for efficient photocatalytic removal of the high-concentration nitrate according to claim 1, wherein in step 2, the first TEOS and the first mixed solution for preparing the $SiO_2$ seed and the second TEOS added later are in a volume ratio of 0.6:100:5; the water, the ammonia water, and the IPA in the first mixed solution are in a volume ratio of 5:3:12; and the first water bath for preparing the $SiO_2$ seed has a temperature of 30° C. to 40° C.

4. The preparation method of the photocatalytic material for efficient photocatalytic removal of the high-concentration nitrate according to claim 1, wherein in step 2, a concentration of the $SiO_2$ microsphere dispersed in the ethanol is 2 g/L; a volume ratio of the APTES to the ethanol is 1:100; and the second water bath for modification with the APTES has a temperature of 50° C. to 60° C.

5. The preparation method of the photocatalytic material for efficient photocatalytic removal of the high-concentration nitrate according to claim 1, wherein in step 3, a concentration of the APTES-$SiO_2$ dispersed in the deionized water is 0.5 g/L; the silver nanoparticle colloid solution has a concentration of 0.1 mg/L; and a volume ratio of the silver nanoparticle colloid solution to the deionized water is (1-10):40.

6. The preparation method of the photocatalytic material for efficient photocatalytic removal of the high-concentration nitrate according to claim 1, wherein in step 4, during the preparation of the $Ag/SiO_2@aTiO_2$, a concentration of each of the $Ag/SiO_2$ and the HDA dispersed in the ethanol is 8 g/L; the ammonia water, the titanium isopropoxide, and the ethanol are in a volume ratio of 1:1:50; and the second reaction is conducted for 10 minutes.

7. The preparation method of the photocatalytic material for efficient photocatalytic removal of the high-concentration nitrate according to claim 1, wherein in step 4, during the preparation of the $Ag/SiO_2@cTiO_2$, a concentration of the $Ag/SiO_2@aTiO_2$ dispersed in the second mixed solution of the ethanol and water is 0.67 g/L, and a ratio of the ethanol to the water in the second mixed solution is 2:1.

8. The preparation method of the photocatalytic material for efficient photocatalytic removal of the high-concentration nitrate according to claim 1, wherein in step 4, the reactor is a stainless-steel high-pressure reactor lined with polytetrafluoroethylene (PTFE); the third reaction in the reactor is conducted at 140° C. to 160° C. for 12 h to 16 h; and the calcination is conducted at 400° C. to 500° C. for 2 h with a heating rate of 5° C./min.

* * * * *